United States Patent
Igami et al.

(10) Patent No.: US 9,747,938 B1
(45) Date of Patent: Aug. 29, 2017

(54) DISC RECORDER AND PLAYER APPARATUS INCLUDING MULTIPLE RECORDER AND PLAYER SUBSYSTEMS

(71) Applicant: Panasonic Intellectual Property Management Co., Ltd., Osaka (JP)

(72) Inventors: Eiichi Igami, Kyoto (JP); Takeo Oosaki, Osaka (JP); Eiji Ueda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/379,591

(22) Filed: Dec. 15, 2016

(30) Foreign Application Priority Data

Mar. 25, 2016 (JP) .................................. 2016-061050

(51) Int. Cl.
  *G11B 5/00* (2006.01)
  *G11B 7/007* (2006.01)
  *G11B 7/09* (2006.01)

(52) U.S. Cl.
  CPC ............ *G11B 7/007* (2013.01); *G11B 7/0901* (2013.01)

(58) Field of Classification Search
  CPC ..... G11B 7/0903; G11B 7/1353; G11B 7/131; G11B 20/1217; G11B 3/00; G11B 3/36; G11B 7/261; G11B 7/004; G11B 7/005; G11B 7/1267; G11B 19/28; G11B 19/26
  USPC ..... 369/44.37, 47.1, 47.37, 94, 47.53, 48.38
  See application file for complete search history.

(56) References Cited

U.S. PATENT DOCUMENTS 5,856,964 A * 1/1999 Shtipelman ............ G11B 7/126
                                                369/44.14

FOREIGN PATENT DOCUMENTS

JP        63-171441       7/1988
JP        2-166665        6/1990

* cited by examiner

*Primary Examiner* — Nabil Hindi
(74) *Attorney, Agent, or Firm* — Wenderoth, Lind & Ponack, L.L.P.

(57) ABSTRACT

A disc recorder and player apparatus includes a plurality of recorder and player subsystems, a disc motor, and a controller. Each of the recorder and player subsystems includes a pickup and a traverse motor. When one of the recorder and player subsystems writes or reads data on or from a first track on the disc recording medium, the controller prohibits the other of the recorder and player subsystems from writing and reading data on and from a second track on the disc recording medium as well as moving the pickup to the second track, the second track being at a position different from a position of the first track, and the second track being to be accessed at a rotational speed different from a rotational speed for the first track.

14 Claims, 16 Drawing Sheets

DISC RECORDER AND PLAYER APPARATUS INCLUDING MULTIPLE RECORDER AND PLAYER SUBSYSTEMS

BACKGROUND

1. Technical Field

The present disclosure relates to a disc recorder and player apparatus for writing and reading data on and from a disc recording medium.

2. Description of Related Art

For example, as disclosed in Japanese Patent Laid-Open Publications Nos. JP 1990-166665 A and JP 1988-171441 A, a disc recording medium, and a recorder and player apparatus for the disc recording medium are known, the recorder and player apparatus being capable of writing or reading data on or from both sides of the disc recording medium (hereinafter, referred to as a side A and a side B).

Japanese Patent Laid-Open Publication No. JP 1990-166665 A discloses a double-sided disc player apparatus capable of reading data from both sides of a disc. The double-sided disc player apparatus according to Japanese Patent Laid-Open Publication No. JP 1990-166665 A includes a pair of pickups disposed on both side across a rotating surface of the disc, supplies a common tracking signal to respective movement mechanisms for the two pickups, and always sets the two pickups at the same radial positions. In addition, the double-sided disc player apparatus according to Japanese Patent Laid-Open Publication No. JP 1990-166665 A separately moves a pickup opposing a second signal surface, when playing a first signal surface, using address signals obtained from the two pickups. Thus, the surface to be played is quickly changed.

Japanese Patent Laid-Open Publication No. JP 1988-171441 A discloses a disc in which data is recorded on both sides thereof. The disc according to Japanese Patent Laid-Open Publication No. JP 1988-171441 A is configured of a first disc and a second disc attached back-to-back, the first disc for recording time-series data as a clockwise information sequence on its information surface, and the second disc for recording time-series data as a counter-clockwise information sequence on its information surface. Thus, data is successively read from both the sides of the disc, without changing a motor's rotation direction, and without temporal interruption.

SUMMARY

In a recorder and player apparatus having a plurality of recorder and player subsystems, the plurality of recorder and player subsystems may interfere with each other when the plurality of recorder and player subsystems operate at the same time, and thus, the performance of the recorder and player apparatus (for example, signal quality of written or read data, a data writing or reading rate) may rather deteriorates.

One non-limiting and exemplary embodiment provides a disc recorder and player apparatus less likely to impair the data writing and reading performance, even though including a plurality of recorder and player subsystems.

According to one aspect of the present disclosure, a disc recorder and player apparatus includes: a plurality of recorder and player subsystems that write and read data on and from at least one recording surface of a disc recording medium; a disc motor that rotates the disc recording medium; and at least one controller. Each of the plurality of recorder and player subsystems includes: a pickup that writes and reads data on and from one recording surface of the disc recording medium, and a traverse motor that moves the pickup in a radial direction of the disc recording medium. When one of the plurality of recorder and player subsystems writes or reads data on or from a first track of a plurality of tracks on the disc recording medium, the controller prohibits the remaining recorder and player subsystems of the plurality of recorder and player subsystems from writing and reading data on and from a second track of the plurality of tracks on the disc recording medium as well as moving the pickup to the second track, the second track being at a position different from a position of the first track, and the second track being to be accessed at a rotational speed different from a rotational speed for the first track.

The present disclosure can provide a disc recorder and player apparatus less likely to impair the data writing and reading performance, even though including a plurality of recorder and player subsystems.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

From now on, embodiments will be described in detail with reference to the drawings as needed. It is noted that unnecessarily detailed descriptions may be omitted. For example, detailed descriptions of well-known facts and repeated descriptions of substantially the same elements may be omitted. This is used for the purpose of avoiding unnecessary redundancy of the following description and facilitating understanding by those skilled in the art.

The accompanying drawings and the following description are provided for sufficient understanding of this disclosure by those skilled in the art, and it is not intended to limit the subject matter described in claims thereto.

In the following embodiments, a write-once optical disc is described as an exemplary recording medium.

First Embodiment

A first embodiment will be described below with reference to FIGS. 1 to 7.

1-1. Configuration

Figure 1:
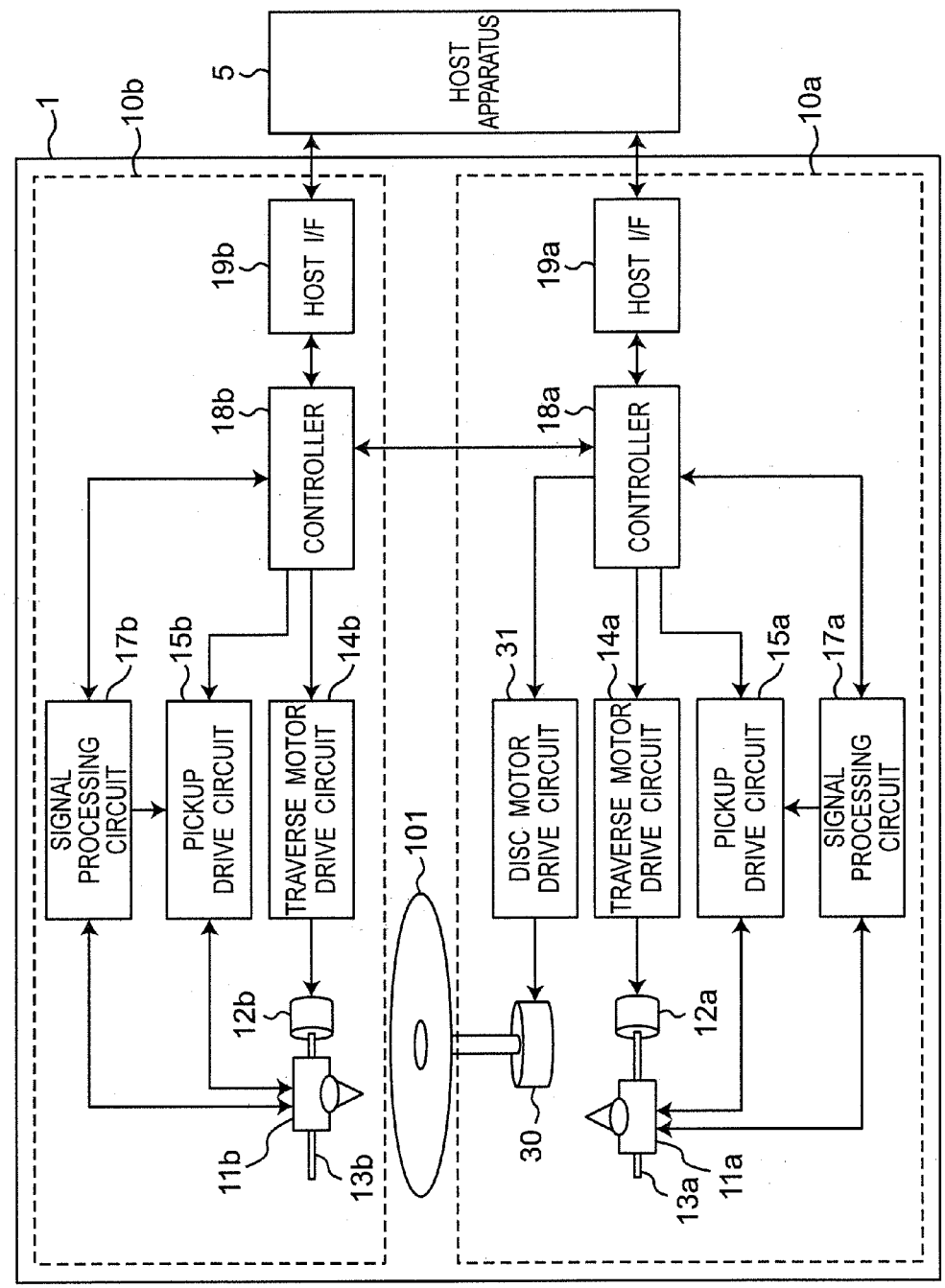
FIG. 1 is a block diagram illustrating a configuration of a disc recorder and player apparatus 1 according to a first embodiment.

FIG. 1 is a block diagram illustrating a configuration of a disc recorder and player apparatus 1 according to a first embodiment. In the embodiment, the disc recorder and player apparatus 1 is configured to be capable of writing and reading data on and from both sides of an optical disc 101.

The optical disc 101 is a recording medium in which data can be written on and read from both sides thereof. The optical disc 101 has a side A, and a side B opposite to the side A. The optical disc 101 has one or more recording layers on each of the side A and the side B. Tracks on the respective recording layers are formed as clockwise spirals from an inner periphery to an outer periphery on one of the side A and the side B, and formed as counterclockwise spirals from the inner periphery to the outer periphery on the other one of the side A and the side B. As a result, it is possible to write and read data on and from both the sides of the optical disc 101, simultaneously.

The tracks on the respective recording layers of the optical disc 101 are addressed so that the tracks with the same address are at the same radial positions (distances from a center of the optical disc 101, i.e., positions in a radial direction). When writing and reading data on and from the optical disc 101, in general, optical pickups move from a track with a smaller address to a track with a larger address.

The disc recorder and player apparatus 1 includes recorder and player subsystems 10a and 10b. In this embodiment, the disc recorder and player apparatus 1 holds the optical disc 101 horizontally, and the optical disc 101 is mounted to the disc recorder and player apparatus 1 such that the side A is directed downward. The recorder and player subsystem 10a writes and reads data on and from the side A (lower side) of the optical disc 101, and the recorder and player subsystem 10b writes and reads data on and from the side B (upper side) of the optical disc 101.

The recorder and player subsystem 10a is disposed below the optical disc 101. The recorder and player subsystem 10a includes an optical pickup 11a, a traverse motor 12a, a lead screw 13a, a traverse motor drive circuit 14a, a pickup drive circuit 15a, a signal processing circuit 17a, a controller 18a, a host interface 19a, a disc motor 30, and a disc motor drive circuit 31.

The disc motor 30 rotates the optical disc 101. The disc motor drive circuit 31 obtains rotational speed information from the disc motor 30, and transmits drive information to the disc motor 30 based on the obtained rotational speed information. Thus, the disc motor drive circuit 31 controls the disc motor 30 so as to operate the disc motor 30 at a desired rotational speed.

The optical pickup 11a includes a laser light source that emits a laser beam to write and read data on and from the optical disc 101, a detector that detects reflected light, a lens for focusing a laser beam onto a desired position of a recording layer of and a track on the optical disc 101, and an actuator that drives the lens (these components are not shown).

The optical pickup 11a is disposed to oppose the side A of the optical disc 101. The optical pickup 11a emits a laser beam to a recording surface on the side A of the optical disc 101, and detects reflected light from the recording surface of the optical disc 101.

The traverse motor 12a rotates the lead screw 13a to move the optical pickup 11a in the radial direction of the optical disc 101. The traverse motor drive circuit 14a controls movement of the optical pickup 11a. That is, when the traverse motor drive circuit 14a receives a move command of the optical pickup 11a from the controller 18a, the traverse motor drive circuit 14a drives the traverse motor 12a to move the optical pickup 11a to a target radial position of the optical disc 101.

The pickup drive circuit 15a controls light emission power of the laser light source of the optical pickup 11a, based on a signal indicating a light emission pattern, sent from the signal processing circuit 17a. In addition, the pickup drive circuit 15a controls a lens position of the optical pickup 11a.

The signal processing circuit 17a optimizes an amplitude of a read signal detected from the optical disc 101 by the optical pickup 11a, and shapes a waveform of the signal on a time axis, thus decoding the data of the optical disc 101. In addition, the signal processing circuit 17a encodes data to be written on the optical disc 101, and send a signal indicating a light emission pattern of the laser light source based on the encoded data, to the pickup drive circuit 15a.

The host interface (I/F) 19a transfers data between a host apparatus 5 and the controller 18a. The controller 18a controls the components of the recorder and player subsystem 10a. The controller 18a controls the components of the recorder and player subsystem 10a according to a write command, a read command, and the like from the host apparatus 5, and controls writing and reading of data on and from the side A of the optical disc 101.

The recorder and player subsystem 10b is disposed on a side opposite to the recorder and player subsystem 10a across the optical disc 101, that is, is disposed above the optical disc 101. The recorder and player subsystem 10b is configured in a manner similar to that of the recorder and player subsystem 10a, except that the recorder and player subsystem 10b does not include the disc motor 30 and the disc motor drive circuit 31. That is, the recorder and player subsystem 10b includes an optical pickup 11b, a traverse motor 12b, a lead screw 13b, a traverse motor drive circuit 14b, a pickup drive circuit 15b, a signal processing circuit 17b, a controller 18b, and a host interface 19b.

The optical pickup 11b is disposed to oppose the side B of the optical disc 101. The optical pickup 11b emits a laser beam to a recording surface of the side B of the optical disc 101, and detects reflected light from the recording surface of the optical disc 101.

Since the other components of the recorder and player subsystem 10b are basically similar to the corresponding components of the recorder and player subsystem 10a, a further description thereof will be omitted.

The controllers 18a and 18b are connected to each other. The controllers 18a and 18b can communicate with each other in a serial manner. The controllers 18a and 18b use a common protocol to communicate, exchange information, and cooperate with each other.

The host apparatus 5 can independently access both the sides of the optical disc 101 via the host interfaces 19a and 19b. Therefore, by using both the sides of the optical disc 101, it is possible to increase capacity, and in addition, improve a data transfer rate for writing and reading data on and from the optical disc 101.

1-2. Operation 1-2-1. Procedure for Accessing Optical Disc

An operation of the disc recorder and player apparatus 1 with an aforementioned configuration will be described below.

The tracks on the optical disc 101 have predetermined rotational speeds, the speed depending on radial positions of the tracks. In order to write or read data on or from a track at a certain radial position, the optical disc 101 should be rotated at the rotational speed for this track.

For example, when the recorder and player subsystem 10a is writing or reading data on or from a certain track on the optical disc 101, the recorder and player subsystem 10b can write and read data only on and from a track, which is at a radial position substantially the same as the radial position of the track for the recorder and player subsystem 10a, and is to be accessed (i.e., writing or reading data) at the same rotational speed as the rotational speed for the track for the recorder and player subsystem 10a. In this case, even when the recorder and player subsystem 10b receives a command to write or read data on or from another track on the optical disc 101, which is at a radial position different from the radial position of the track for the recorder and player subsystem 10a, and is to be accessed at a rotational speed different from the rotational speed for the track for the recorder and player subsystem 10a, the recorder and player subsystem 10b cannot appropriately write or read the data.

Accordingly, this embodiment provides the disc recorder and player apparatus less likely to impair the data writing and reading performance, and thus operable efficiently, when commands are received that the recorder and player subsystems 10a and 10b write or read data on or from different tracks to be accessed at different rotational speeds at different positions.

In the disc recorder and player apparatus 1 according to this embodiment, one of the recorder and player subsystems 10a and 10b has control rights for controlling the rotational speed of the disc motor 30. The controller 18a of the recorder and player subsystem 10a and the controller 18b of the recorder and player subsystem 10b determine which of the recorder and player subsystems 10a and 10b has the control rights, through the communications between them. The controller having the control rights substantially controls the rotational speed of the disc motor 30. The disc motor 30 operates at a rotational speed for a track on or from which the recorder and player subsystem having the control rights writes or reads data.

Figure 2:
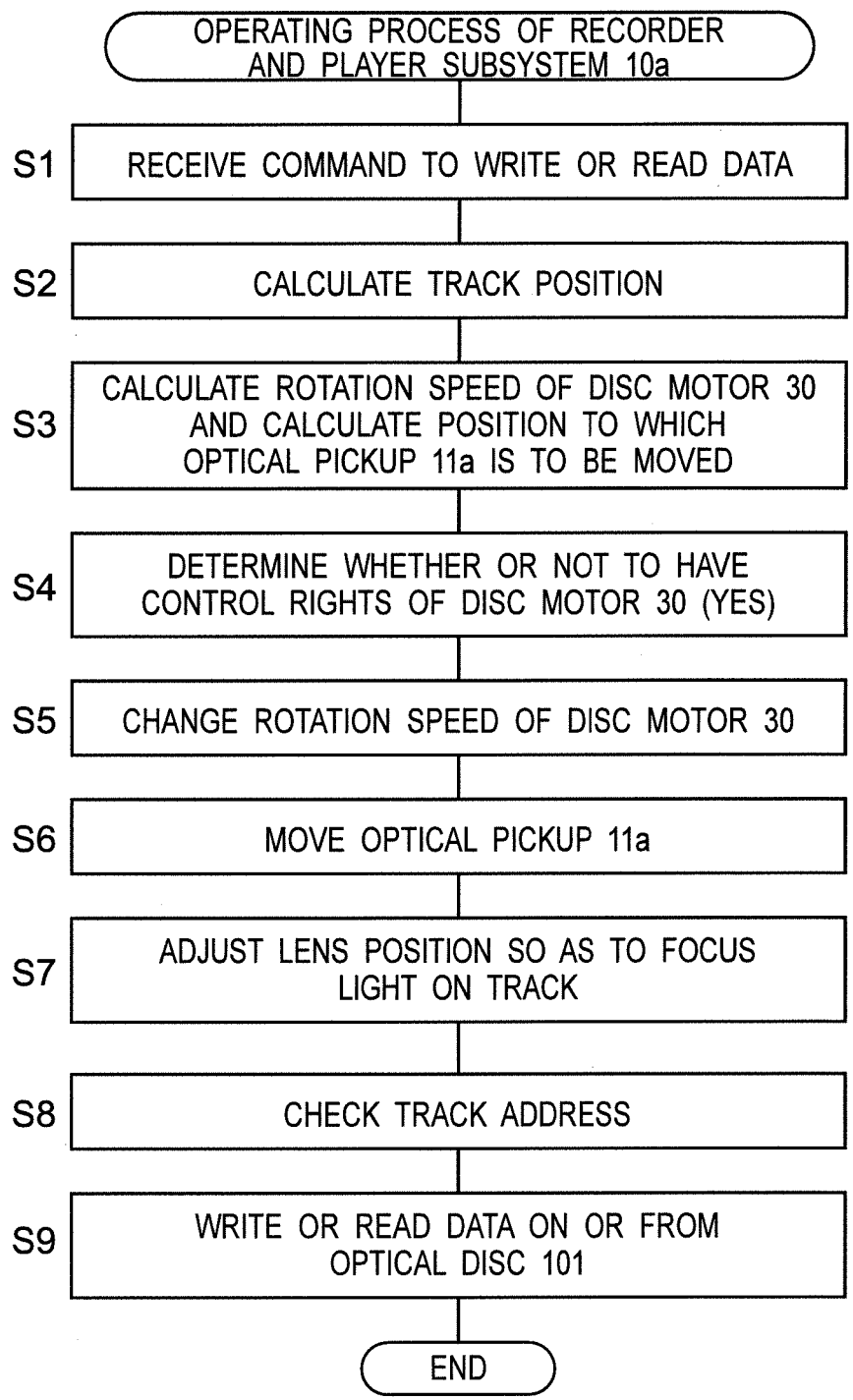
FIG. 2 is a flowchart illustrating an operating process of a recorder and player subsystem 10a of FIG. 1, in a case where the recorder and player subsystem 10a writes or reads data on or from an optical disc 101 when the recorder and player subsystem 10a has control rights of a disc motor 30.

FIG. 2 is a flowchart illustrating an operating process of the recorder and player subsystem 10a of FIG. 1, in a case where the recorder and player subsystem 10a writes or reads data on or from the optical disc 101 when the recorder and player subsystem 10a has the control rights of the disc motor 30. In this case, only the recorder and player subsystem 10a writes or reads data on or from the side A of the optical disc 101, whereas the recorder and player subsystem 10b does not write or read data on or from the side B of the optical disc 101.

The controller 18a of the recorder and player subsystem 10a executes the process of FIG. 2.

In step S1, the controller 18a receives a command to write or read data, from the host apparatus 5 via the host interface 19a. The command to read data includes an LBA (Logical Block Address) representing a recording position on the side A of the optical disc 101. The command to write data includes an LBA, data to be written, and a length of the data.

In step S2, the controller 18a calculates a PBA (Physical Block Address) based on the LBA. Further, the controller 18a calculates a radial position of a target track on the optical disc 101, the data being to be written on or read from the target track, the radial position corresponding to the PBA.

In step S3, the controller 18a calculates a rotational speed of the disc motor 30, and calculates a radial position to which the optical pickup 11a is to be moved. The rotational speed and the radial position are to be used when actually writing or reading data on or from the optical disc 101 according to the command received in step S1. The rotational speed and the radial position can be calculated from a data format, an access position, and a linear speed of the optical disc 101.

Before moving the optical pickup 11a to the radial position calculated in step S3, the controller 18a changes the rotational speed of the disc motor 30 to the rotational speed calculated in step S3. For this purpose, in step S4, the controller 18a determines whether or not to have the control rights of the disc motor 30. In this case, the controller 18a has the control rights.

In step S5, the controller 18a controls the disc motor drive circuit 31 to change the rotational speed of the disc motor 30 to the rotational speed calculated in step S3.

In step S6, the controller 18a controls the traverse motor drive circuit 14a to drive the traverse motor 12a, and thus, move the optical pickup 11a to the radial position of the target track. The traverse motor drive circuit 14a drives the traverse motor 12a to rotate the lead screw 13a, and thus, moves the optical pickup 11a to the radial position of the target track.

In step S7, the controller 18a controls the pickup drive circuit 15a to adjust a position of the lens of the optical pickup 11a so as to focus light onto a target recording layer and the target track. The pickup drive circuit 15a moves the lens of the optical pickup 11a to focus the laser beam onto the target recording layer and the target track.

In step S8, the signal processing circuit 17a extracts an address from a signal obtained from reflected light of the optical disc 101, and the controller 18a checks that the extracted address is identical to the address of the target track. When the extracted address is not identical to the address of the target track, in other words, when the light is not focused onto the target recording layer and the target track, the controller 18a repeats the adjustment of the lens position of the optical pickup 11a (step S7) until the light is focused onto the target recording layer and the target track. If it is necessary to move the lens of the optical pickup 11a further than its adjustable range in order to focus the light onto the target recording layer and the target track, the process returns to step S6.

In step S9, the controller 18a controls the pickup drive circuit 15a and the signal processing circuit 17a to write or read the data on or from the optical disc 101.

Figure 3:
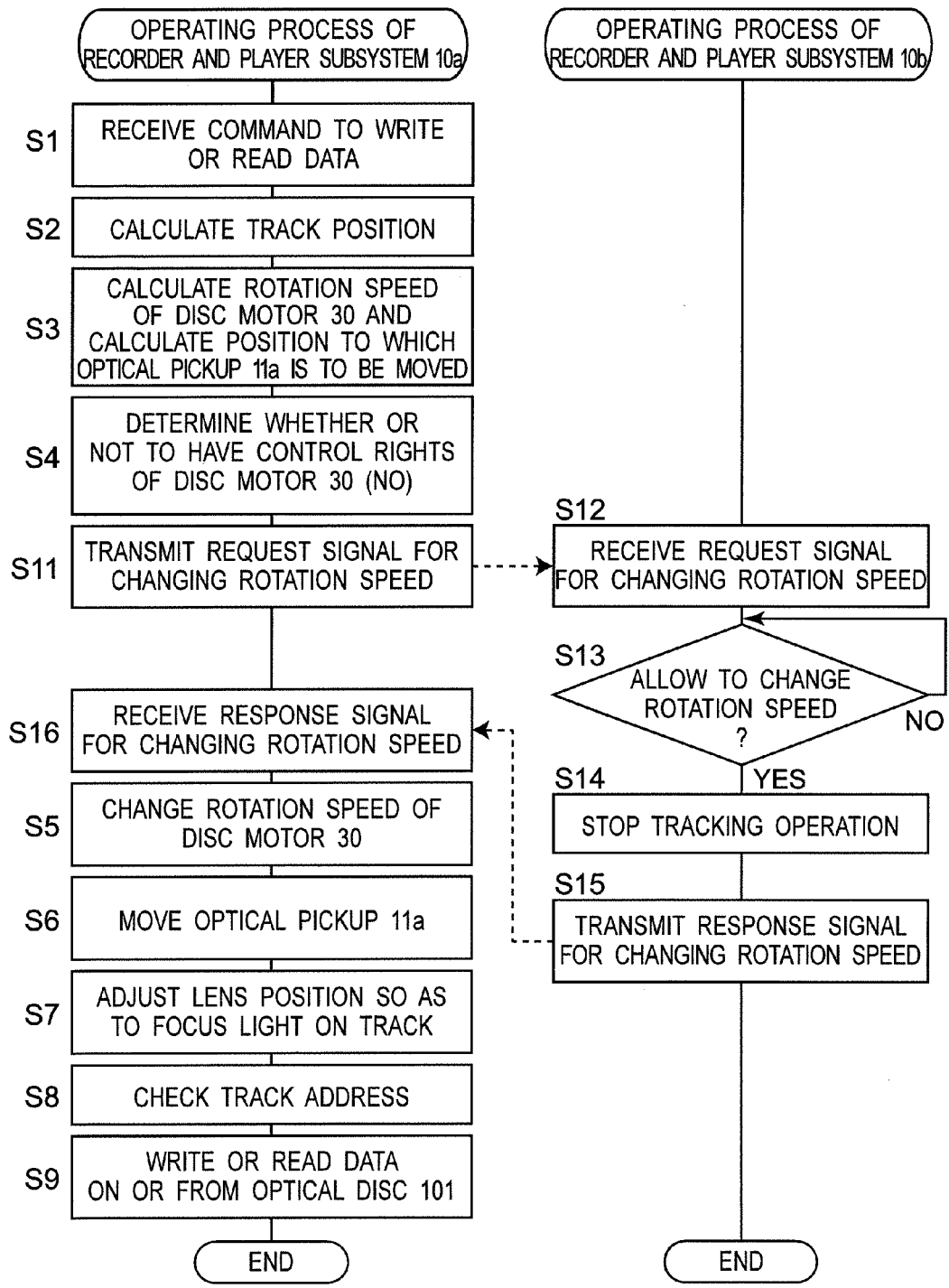
FIG. 3 is a flowchart illustrating operating processes of the recorder and player subsystems 10a and 10b of FIG. 1, in a case where the recorder and player subsystem 10a writes or reads data on or from the optical disc 101 when the recorder and player subsystem 10a does not have the control rights of the disc motor 30.

FIG. 3 is a flowchart illustrating operating processes of the recorder and player subsystems 10a and 10b of FIG. 1, in a case where the recorder and player subsystem 10a writes or reads data on or from the optical disc 101 when the recorder and player subsystem 10a does not have the control rights of the disc motor 30. When the recorder and player subsystem 10b has the control rights of the disc motor 30, the recorder and player subsystem 10a obtains the control rights from the recorder and player subsystem 10b, and write or read data on or from the side A of the optical disc 101.

The controller 18a of the recorder and player subsystem 10a and the controller 18b of the recorder and player subsystem 10b execute the process of FIG. 3. With respect to the recorder and player subsystem 10b, FIG. 3 illustrates only steps concerning changing the rotational speed of the disc motor 30, and omits the other steps. The recorder and player subsystem 10b may or may not be writing or reading data on or from the optical disc 101 in its initial state.

Steps S1 to S4 of FIG. 3 are similar to steps S1 to S4 of FIG. 2. In step S4 of FIG. 3, the controller 18a determines whether or not to have the control rights of the disc motor 30. In this case, the controller 18b rather than the controller 18a has the control rights.

In steps S11 and S12, the controller 18a transmits a request signal to the controller 18b for changing the rotational speed of the disc motor 30.

In step S13, the controller 18b determines whether or not to allow to change the rotational speed of the disc motor 30 (in other words, whether or not to allow to transfer the control rights), based on current operations of the recorder and player subsystems 10a and 10b. When the optical disc 101 has first and second tracks at different positions and to be accessed at different rotational speeds, and the recorder and player subsystem 10b is writing or reading data on or from the first track, in principle, the controller 18b prohibits the recorder and player subsystem 10a from writing and reading data on and from the second track as well as moving the optical pickup 11a to the second track. However, the controller 18b determines whether or not to allow to change the rotational speed, for example, based on the following criteria.

According to a first criterion, the following determination is made, when the recorder and player subsystem 10b having the control rights is writing or reading data. In this case, when a request is further received that the recorder and player subsystem 10a not having the control rights writes or reads data, the controller 18a transfers the control rights from the recorder and player subsystem 10b to the recorder and player subsystem 10a, after the recorder and player subsystem 10b has completed to write or read data. Particularly, when data is being written on the optical disc 101, it is not possible to interrupt this recording operation nor change the rotational speed of the disc motor 30, since the data to be written may be damaged by such interruption or change. According to the first criterion, the controller 18b prohibits the recorder and player subsystem 10a from writing or reading data as well as changing the rotational speed of the disc motor 30, until the recorder and player subsystem 10b has completed to write or read data. After the recorder and player subsystem 10b has completed to write or read data, the controller 18b allows to transfer the control rights and change the rotational speed.

It is noted that when recording data on the optical disc 101, the data is encoded into a series of "recording units", each having a predetermined data length. The recording unit is a unit interval of data to be recorded on the optical disc 101 without interruption, for example, a unit interval of data encoded using an error correction code.

According to a second criterion, the following determination is made, when the recorder and player subsystem 10b having the control rights is writing or reading data from the first track of the plurality of tracks on the optical disc 101, the first track having the first address. In this case, when a request is further received that the recorder and player subsystem 10a not having the control rights writes or reads data on or from the second track of the plurality of tracks on the optical disc 101, the second track having the second address smaller than the first address, the controller 18a requests the controller 18b to stop the recorder and player subsystem 10b from writing or reading the data. After the recorder and player subsystem 10b has stopped writing or reading the data, the controllers 18a and 18b transfer the control rights from the recorder and player subsystem 10b to the recorder and player subsystem 10a. It is noted that when the recorder and player subsystem 10b is writing the data, and the controller 18b is requested to stop writing the data, the controller 18b stops writing the data after having written an entire recording unit being currently written. When writing and reading data on and from both the sides of the optical disc 101, simultaneously, the optical pickups 11a and 11b should be at tracks to be accessed at the same rotational speed (for example, the same radial position). When it is requested that the optical pickup 11a writes or reads data on or from a track having smaller address than a current address of the optical pickup 11b (in other words, when the optical pickup 11a is behind the optical pickup 11b), the optical pickup 11b may stop writing and reading the data, and wait until the optical pickup 11a catches up. In this case, when the optical pickup 11a reaches the radial position of the optical pickup 11b, the optical pickup 11b restarts to write and read the data, and thereafter, the optical pickups 11a and 11b may write and read data on and from both the sides of the optical disc 101, simultaneously.

According to a third criterion, the following determination is made, when the recorder and player subsystem 10b having the control rights is writing or reading user data. In this case, when a request is further received that the recorder and player subsystem 10a not having the control rights writes or reads disc management data, the controller 18a requests the controller 18b to stop the recorder and player subsystem 10b from writing or reading the user data. After the recorder and player subsystem 10b has stopped writing or reading the user data, the controllers 18a and 18b transfer the control rights from the recorder and player subsystem 10b to the recorder and player subsystem 10a. It is noted that when the recorder and player subsystem 10b is writing the data, and the controller 18b is requested to stop writing the data, the controller 18b stops writing the data after having written an entire recording unit being currently written. The disc management data is data used for managing writing and reading of data on and from the optical disc 101, such as track information, defect managing information, and so on, and the user data is any data other than the disc management data. When writing and reading data on and read from the optical disc 101, the disc management data may be prioritized over the user data.

If YES in step S13, the process proceeds to step S14. If NO in step S13, the controller 18b repeats step S13, and waits until a criterion for allowing to change the rotational speed of the disc motor 30 is satisfied.

In step S14, the controller 18b stops the tracking control of the recorder and player subsystem 10b. After the criterion for allowing to change the rotational speed of the disc motor 30 is satisfied, if immediately changing the rotational speed of the disc motor 30 for the recorder and player subsystem 10a to write or read the data, the rotational speed of the disc motor 30 changes to a rotational speed different from the rotational speed corresponding to the radial position of the optical pickup 11b. In this case, tracking servo control of the recorder and player subsystem 10b may become unstable. Therefore, in order to avoid unnecessary tracking control, the recorder and player subsystem 10b stops the tracking control in step S14.

In steps S15 and S16, the controller 18b transmits a response signal to the controller 18a for changing the rotational speed of the disc motor 30. By transmitting this response signal, the controller 18b notifies the controller 18a of the allowance for changing the rotational speed, in other words, the allowance for transferring the control rights.

Step S5 to S9 of FIG. 3 are similar to steps S5 to S9 of FIG. 2.

After the controller 18a has obtained the control rights of the disc motor 30, the controller 18a can arbitrarily change the rotational speed of the disc motor 30, until next transfer of the control rights to the controller 18b. When the controller 18a has changed the rotational speed of the disc motor 30, the controller 18a notifies the controller 18b of the changed rotational speed. As a result, when the rotational speed for the track, on or from which data is to be written or read, is identical to a current rotational speed of the disc motor 30, the controller 18b can write or read data on or from the optical disc 101 even if not having the control rights, as described later.

Figure 4:
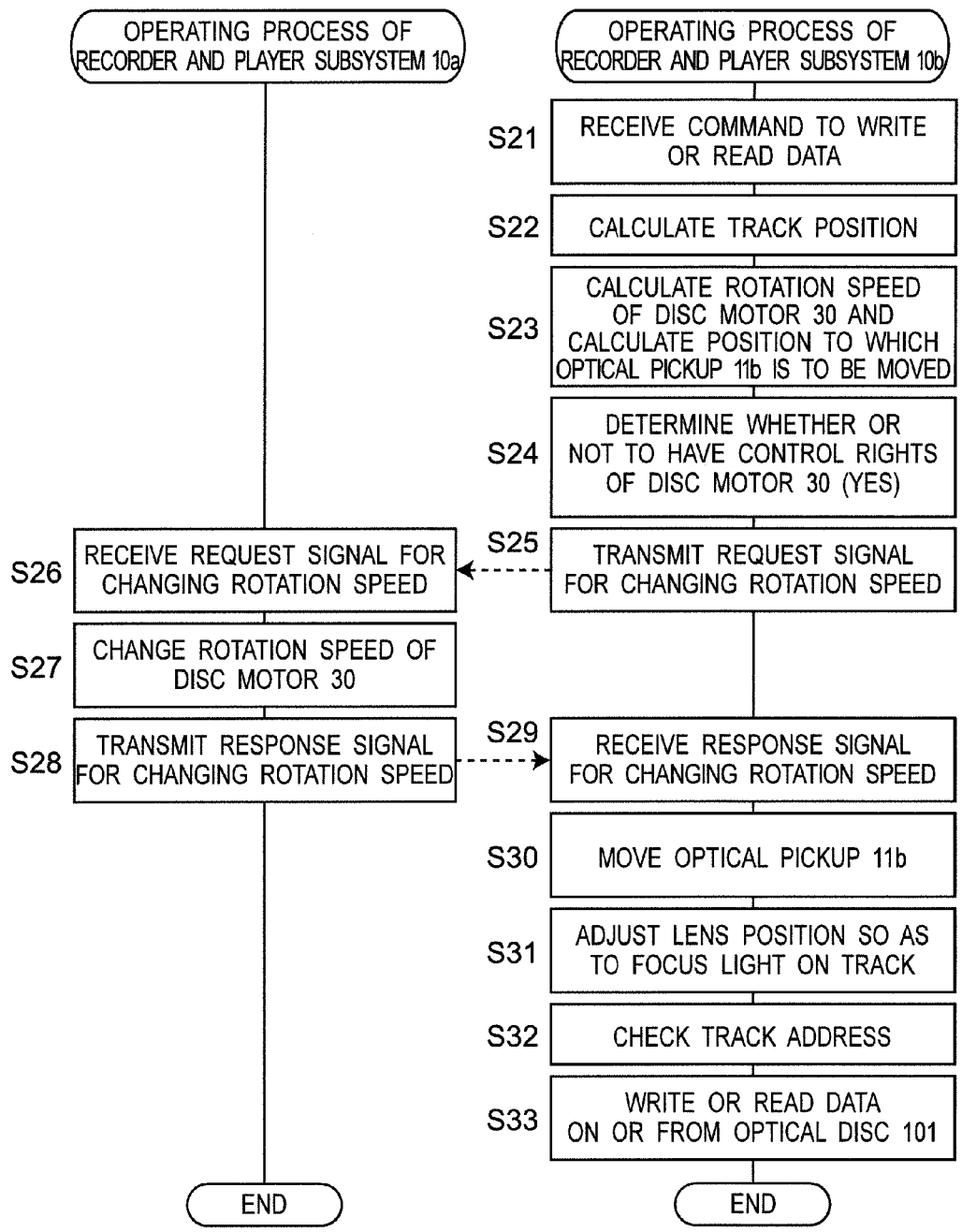
FIG. 4 is a flowchart illustrating operating processes of the recorder and player subsystems 10a and 10b of FIG. 1, in a case where the recorder and player subsystem 10b writes or reads data on or from the optical disc 101 when the recorder and player subsystem 10b has the control rights of the disc motor 30.

FIG. 4 is a flowchart illustrating operating processes of the recorder and player subsystems 10a and 10b of FIG. 1, in a case where the recorder and player subsystem 10b writes or reads data on or from the optical disc 101 when the recorder and player subsystem 10b has the control rights of a disc motor 30. In this case, only the recorder and player subsystem 10b writes or reads data on or from the side B of the optical disc 101, whereas the recorder and player subsystem 10a does not write or read data on or from the side A of the optical disc 101.

The controller 18a of the recorder and player subsystem 10a and the controller 18b of the recorder and player subsystem 10b execute the process of FIG. 4.

In step S21, the controller 18b receives a command to write or read data, from the host apparatus 5 via the host interface 19b.

In step S22, the controller 18b calculates a radial position of a target track on the optical disc 101, the data being to be written on or read from the target track.

In step S23, the controller 18b calculates a rotational speed of the disc motor 30, and calculates a radial position to which the optical pickup 11b is to be moved.

Before moving the optical pickup 11b to the radial position calculated in step S23, the controller 18b changes the rotational speed of the disc motor 30 to the rotational speed calculated in step S23. For this purpose, in step S24, the controller 18b determines whether or not to have the control rights of the disc motor 30. In this case, the controller 18b has the control rights.

Although the controller 18b has the control rights, the controller 18a is responsible to directly control the disc motor 30. Accordingly, in steps S25 and S26, the controller 18b transmits a request signal to the controller 18a for changing the rotational speed of the disc motor 30.

In step S27, the controller 18a controls the disc motor drive circuit 31 to change the rotational speed of the disc motor 30.

In steps S28 and S29, the controller 18a transmits a response signal to the controller 18b for changing the rotational speed of the disc motor 30. By transmitting this response signal, the controller 18a notifies the controller 18b that the rotational speed has changed.

In step S30, the controller 18b controls the traverse motor drive circuit 14b to drive the traverse motor 12b, and thus, move the optical pickup 11b to the radial position of the target track. The traverse motor drive circuit 14b drives the traverse motor 12b to rotate the lead screw 13b, and thus, moves the optical pickup 11b to the radial position of the target track.

In step S31, the controller 18b controls the pickup drive circuit 15b to adjusts a position of the lens of the optical pickup 11b so as to focus light onto a target recording layer and the target track. The pickup drive circuit 15b moves the lens of the optical pickup 11b to focus a laser beam onto the target recording layer and the target track.

In step S32, the signal processing circuit 17b extracts an address from a signal obtained from reflected light of the optical disc 101, and the controller 18b checks that the extracted address is identical to the address of the target track. When the extracted address is not identical to the address of the target track, in other words, when the light is not focused onto the target recording layer and the target track, the controller 18b repeats the adjustment of the lens position of the optical pickup 11b (step S31) until the light is focused onto the target recording layer and the target track. If it is necessary to move the lens of the optical pickup 11b further than its adjustable range in order to focus the light onto the target recording layer and the target track, the process returns to step S30.

In step S33, the controller 18b controls the pickup drive circuit 15b and the signal processing circuit 17b to write or read the data on or from the optical disc 101.

Figure 5:
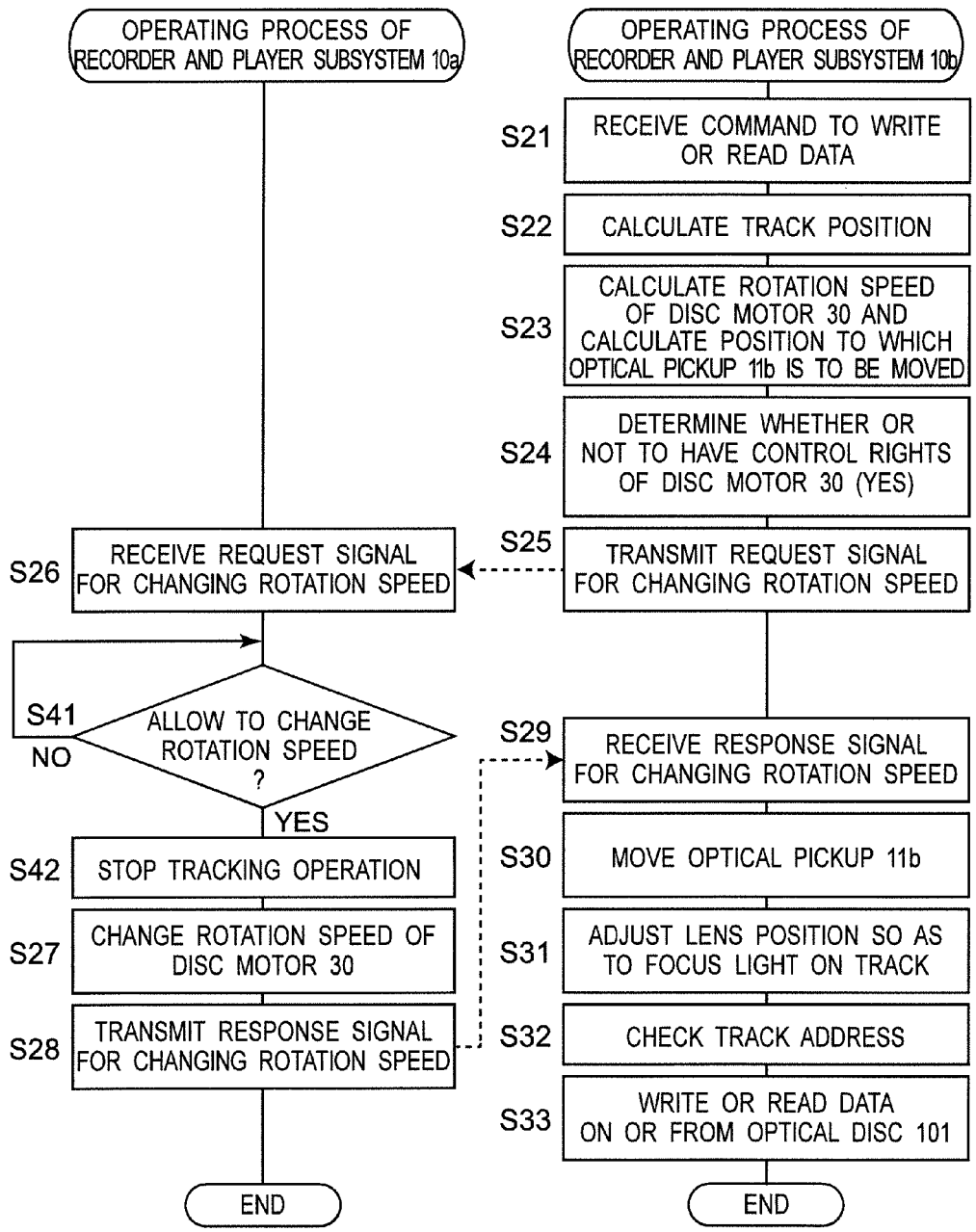
FIG. 5 is a flowchart illustrating operating processes of the recorder and player subsystems 10a and 10b of FIG. 1, in a case where the recorder and player subsystem 10b writes or reads data on or from the optical disc 101 when the recorder and player subsystem 10b does not have the control rights of the disc motor 30.

FIG. 5 is a flowchart illustrating operating processes of the recorder and player subsystems 10a and 10b of FIG. 1, in a case where the recorder and player subsystem 10b writes or reads data on or from the optical disc 101 when the recorder and player subsystem 10b does not have the control rights of the disc motor 30. When the recorder and player subsystem 10a has the control rights of the disc motor 30, the recorder and player subsystem 10b obtains the control rights from the recorder and player subsystem 10a, and writes or reads data on or from the side B of the optical disc 101.

The controller 18a of the recorder and player subsystem 10a and the controller 18b of the recorder and player subsystem 10b execute the process of FIG. 5. With respect to the recorder and player subsystem 10a, FIG. 5 illustrates only steps concerning changing the rotational speed of the disc motor 30, and omits the other steps. The recorder and player subsystem 10a may or may not be writing or reading data on or from the optical disc 101 in its initial state.

Steps S21 to S24 of FIG. 5 are similar to steps S21 to S24 of FIG. 4. In step S4 of FIG. 5, the controller 18b determines whether or not to have the control rights of the disc motor 30. In this case, the controller 18a rather than the controller 18b has the control rights.

In steps S25 and S26, the controller 18b transmits a request signal to the controller 18a for changing the rotational speed of the disc motor 30.

In step S41, the controller 18a determines whether or not to allow to change the rotational speed of the disc motor 30 (in other words, whether or not to allow to transfer the control rights), based on current operations of the recorder and player subsystems 10a and 10b. When the optical disc 101 has first and second tracks at different positions and to be accessed at different rotational speeds, and the recorder and player subsystem 10a is writing or reading data on or from the first track, in principle, the controller 18b prohibits the recorder and player subsystem 10b from writing and reading data on and from the second track as well as moving the optical pickup 11b to the second track. However, the controller 18a determines whether or not to allow to change the rotational speed, for example, based on the aforementioned first to third criteria. If YES in step S41, the process proceeds to step S42. If NO in step S41, the controller 18a repeats step S41, and waits until a criterion for allowing to change the rotational speed of the disc motor 30 is satisfied.

In step S42, the controller 18a stops the tracking control of the recorder and player subsystem 10a.

In step S27, the controller 18a controls the disc motor drive circuit 31 to change the rotational speed of the disc motor 30.

In steps S28 and S29, the controller 18a transmits a response signal to the controller 18b for changing the rotational speed of the disc motor 30. By transmitting this response signal, the controller 18b notifies the controller 18a of the allowance for changing the rotational speed, in other words, the allowance for transferring the control rights, and notifies the controller 18a that the rotational speed has changed.

Steps S30 to S33 of FIG. 5 are similar to steps S30 to S33 of FIG. 4.

After the controller 18b has obtained the control rights of the disc motor 30, the controller 18b can arbitrarily change the rotational speed of the disc motor 30, until next transfer of the control rights to the controller 18a. It is noted that the controller 18a is responsible to directly control the disc motor 30. Accordingly, also after the controller 18b has obtained the control rights, the controller 18b transmits the requesting signal to the controller 18a for changing rotational speed, and in response to the request signal, the controller 18a changes the rotational speed of the disc motor 30 to a requested rotational speed. In addition, when the rotational speed for the track, on or from which data is to be written or read, is identical to a current rotational speed of the disc motor 30, the controller 18a can write or read data on or from the optical disc 101 even if not having the control rights, as described later.

According to the operating processes of FIGS. 2 to 5, the disc recorder and player apparatus 1 can appropriately determines the rotational speed of the disc motor 30 based on the operations of the recorder and player subsystems 10a and 10b, and appropriately control writing and reading of data on and from both the sides of the optical disc 101. As a result, even when the disc recorder and player apparatus 1 includes the plurality of recorder and player subsystems 10a and 10b, the data writing and reading performance is less likely impaired.

1-2-2. Rotation Control and Access to Both Sides of Optical Disc

Figure 6:
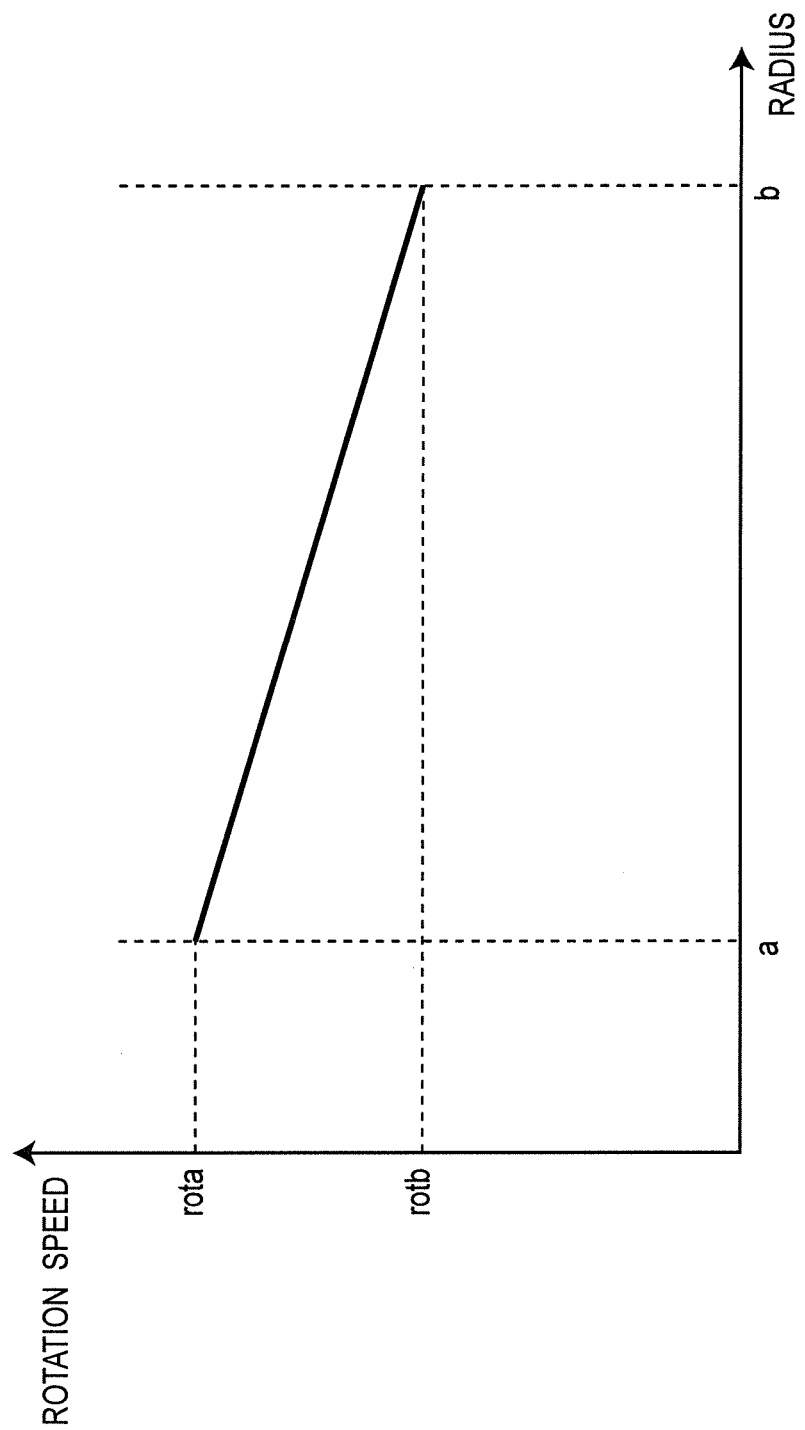
FIG. 6 is a diagram illustrating a relationship between a radial position and a rotational speed of a disc on and from which data is written or read according to CLV (constant linear velocity).
Figure 7:
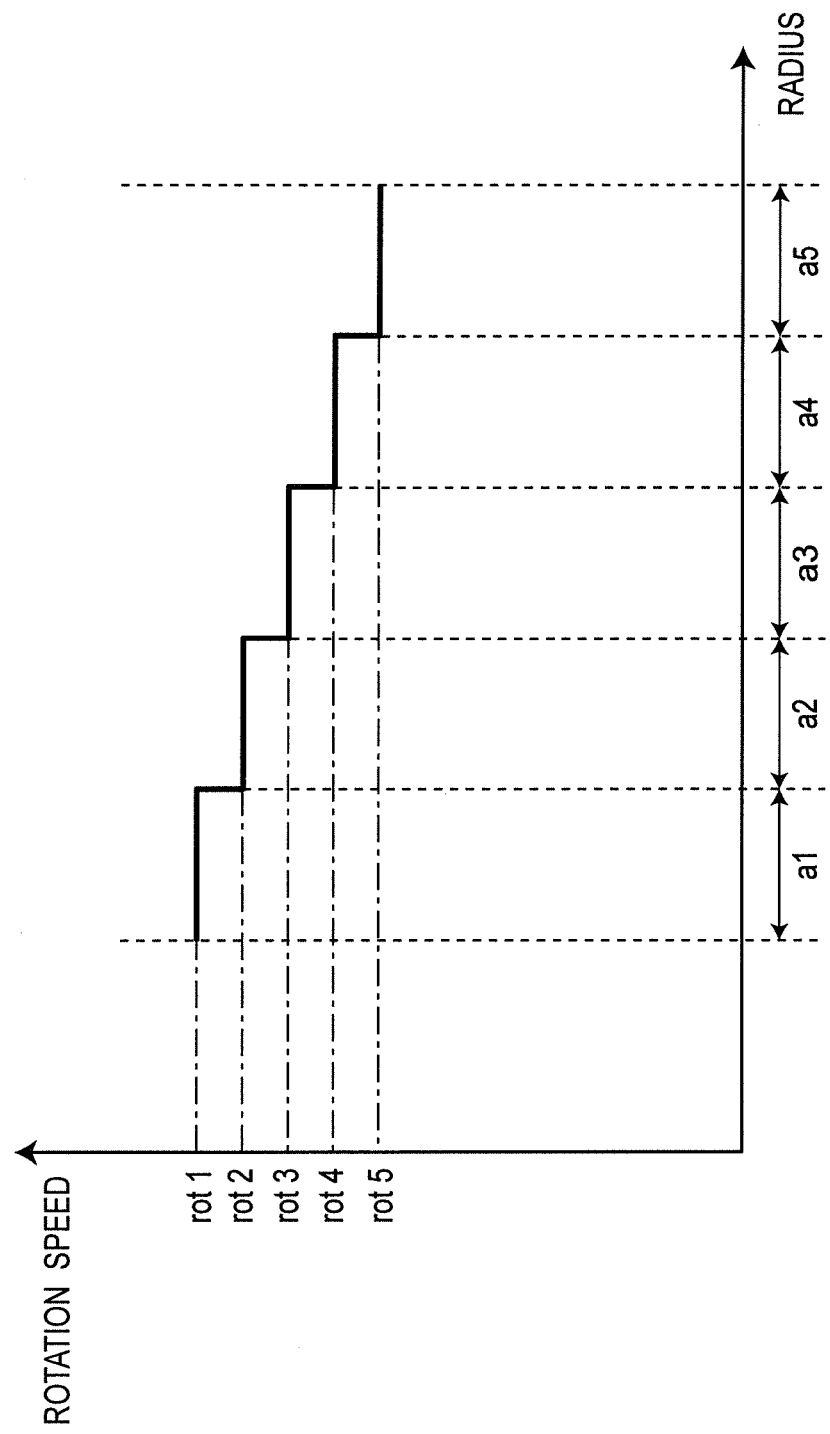
FIG. 7 is a diagram illustrating a relationship between a radial position and a rotational speed of a disc on and from which data is written or read according to ZCAV (zone constant angular velocity).

FIGS. 6 and 7 are diagrams illustrating a relationship between a radial position and a rotational speed in typical rotation control of a disc motor for a 12-cm disc. FIG. 6 is a diagram illustrating a relationship between the radial position and the rotational speed of a disc on and from which data is written and read according to CLV (Constant Linear Velocity). The optical disc 101 is rotated at a rotational speed "rota" for a radial position "a", and at a rotational speed "rotb" for a radial position "b". The CLV is often used for a disc for recording video, in order to ensure a sufficient write/read rate.

FIG. 7 is a diagram illustrating a relationship between a radial position and a rotational speed of a disc on and from which data is written and read according to ZCAV (Zone Constant Angular Velocity; CAV: Constant Angular Velocity). The ZCAV is characterized in that a wide range of radial position is covered when the disc motor is operated at the constant rotational speed. For example, referring to FIG. 7, when the disc motor is set at the rotational speed "rot1", data can be written on or read from a track included in a range "a1" of radial position. Similarly, when the disc motor is set at the rotational speeds "rot2" to rots, data can be written on or read from tracks included in ranges "a2" to "a5" of radial position, respectively. A case where the disc recorder and player apparatus 1 according to the first embodiment writes or reads data according to ZCAV will be described below.

At first, the controller 18a has the control rights of the disc motor 30. For example, when the optical pickup 11a writes or reads data on or from a track included in the range "a1" of radial position of the optical disc 101, the controller 18a sets the rotational speed of the disc motor 30 to the rotational speed "rot1". In this case, the optical pickup 11a can write or read data on or from tracks included in the range "a1" of radial position, without changing the motor's rotational speed from rotational speed "rot1". At the same time, similarly, the optical pickup 11b can write or read data on or from tracks included in the range "a1" of radial position. When both the optical pickups 11a and 11b are on the same range "a1" of radial position, the recorder and player subsystems 10a and 10b can simultaneously write or read data on or from the optical disc 101.

However, in this case, for example, when the optical pickup 11b has completed to write or read data on or from the tracks included in the range "a1" of radial position, and is going to write or read data on or from tracks included in the range "a2" of radial position, the controller 18*b* transmits a requesting signal to the controller 18*a* for changing the rotational speed of the disc motor 30 to the rotational speed "rot2" corresponding to the range "a2" of radial position. However, the recorder and player subsystem 10*a* is still writing or reading data on or from the tracks included in the range "a1" of radial position to be accessed at the rotational speed "rot1" different from the rotational speed "rot2", and thus, the controller 18*a* cannot allow to change the rotational speed. Accordingly, the controller 18*a* suspends changing the rotational speed until the recorder and player subsystem 10*a* has completed to write or read the data. Thereafter, when the recorder and player subsystem 10*a* has completed to write or read the data, the controller 18*a* can allow to change the rotational speed. Therefore, after the controller 18*a* stops the tracking control of the optical pickup 11*a*, the controller 18*a* changes the rotational speed of the disc motor 30 to the rotational speed "rot2". As a result, the optical pickup 11*b* can write or read data on or from a track at a target radial position.

Thereafter, when the optical pickup 11*a* has completed to write or read data on or from the tracks included in the range "a1" of radial position, and is going to start to write or read data on or from the tracks included in the range "a2" of radial position, the optical pickup 11*a* can directly start to write or read data because it is not necessary to change the rotational speed. That is, when both the optical pickups 11*a* and 11*b* are in the same range "a2" of radial position, the recorder and player subsystems 10*a* and 10*b* can simultaneously write or read data on or from the optical disc 101.

The optical disc 101 may be a CLV recording medium or a ZCAV recording medium. In addition, the optical disc 101 may be a recording medium formed in a combination of CLV and ZCAV (i.e., formed in CLV in one range of radial position, and formed in ZCAV in another range of radial position).

1-3. Advantageous Effects

According to this embodiment, the disc recorder and player apparatus 1 includes the recorder and player subsystems 10*a* and 10*b* that write and read data on and from at least one recording surface of the optical disc 101, the disc motor 30 that rotates the optical disc 101, and the controllers 18*a* and 18*b*. The recorder and player subsystems 10*a* and 10*b* include the optical pickups 11*a* and 11*b*, and the traverse motors 12*a* and 12*b*, respectively. Each of the optical pickups 11*a* and 11*b* write and read data on and from one recording surface of the optical disc 101. The traverse motors 12*a* and 12*b* move the optical pickups 11*a* and 11*b* in the radial direction of the optical disc 101, respectively. When one of the recorder and player subsystems 10*a* and 10*b* writes or reads data on or from the first track of the plurality of tracks on the optical disc 101, the controllers 18*a* and 18*b* prohibit the other one of the recorder and player subsystems 10*a* and 10*b* from writing and reading data on and from the second track of the plurality of tracks on the optical disc 101 as well as moving the optical pickup to the second track, the second track being at a position different from the position of the first track, and the second track being to be accessed at a rotational speed different from the rotational speed for the first track.

According to this embodiment, the controllers 18*a* and 18*b* allocate control rights for controlling the rotational speed of the disc motor 30 to one of the recorder and player subsystems 10*a* and 10*b*. The controllers 18*a* and 18*b* operate the disc motor 30 at a rotational speed for a track on or from which the recorder and player subsystem having the control rights write or read data.

The controller 18*a* controls the recorder and player subsystem 10*a*, and the controller 18*b* controls the recorder and player subsystem 10*b*. The disc motor 30 is a part of the recorder and player subsystem 10*a*. The controllers 18*a* and 18*b* cooperate with each other.

Thus, it is possible to provide the disc recorder and player apparatus 1 less likely to impair the data writing and reading performance (for example, signal quality of written or read data, a data writing or reading rate), even though including the plurality of recorder and player subsystems 10*a* and 10*b*.

According to this embodiment, it is possible to provide the disc recorder and player apparatus 1 that is simple, inexpensive, efficient, reliable, and stable.

Second Embodiment

A second embodiment will be described below with reference to FIGS. 8 and 9.

2-1. Configuration

A disc recorder and player apparatus according to the second embodiment is configured in a manner similar to that of the disc recorder and player apparatus 1 of FIG. 1.

2-2. Operation

In the disc recorder and player apparatus 1 including the plurality of recorder and player subsystems 10*a* and 10*b* including the optical pickups 11*a* and 11*b*, respectively, when moving one of the optical pickups, a vibration or shock caused by the movement may adversely affect data writing and reading operations of the other one of the optical pickups, and thus, impair the data writing and reading performance. The movement of the optical pickup includes movement for following a track (relatively short movement), and movement for accessing a designated address on the optical disc 101 (relatively long movement). Particularly, the latter movement may adversely affect data writing and reading operations of the other optical pickup.

Accordingly, this embodiment provides the disc recorder and player apparatus less likely to impair the data writing and reading performance, and thus operable efficiently, when receiving a command to write or read data to be carried out as well as move one of the optical pickups 11*a* and 11*b*.

The controllers 18*a* and 18*b* determine whether or not to move the optical pickups 11*a* and 11*b* in the radial direction of the optical disc 101, based on current operations of the recorder and player subsystems 10*a* and 10*b*. The "operations" mean any one of a read operation in which data is being read form the optical disc 101, a write operation in which data is being written on the optical disc 101, and other operations.

Figure 8:
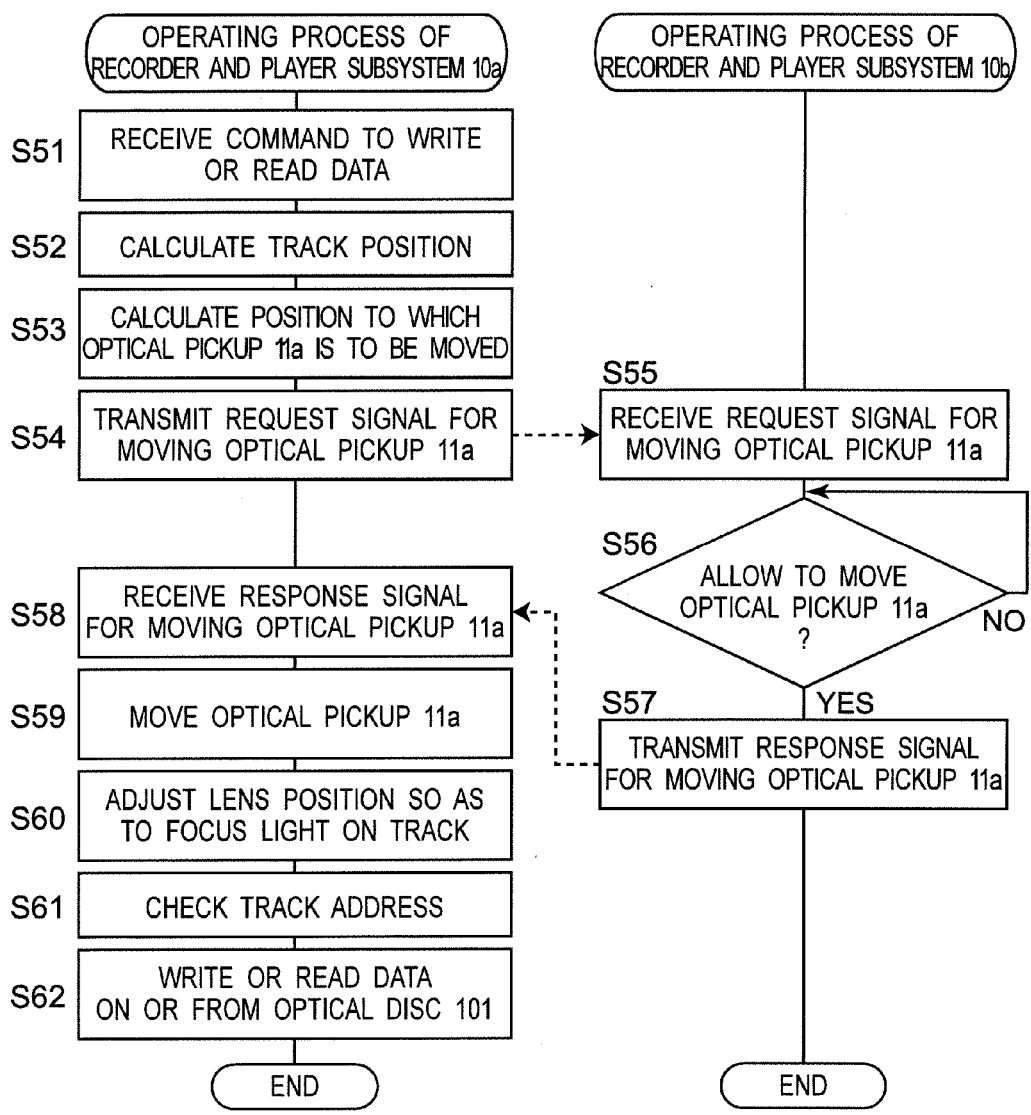
FIG. 8 is a flowchart illustrating operating processes of recorder and player subsystems 10a and 10b of a disc recorder and player apparatus according to a second embodiment, in a case where the recorder and player subsystem 10a writes or reads data on or from an optical disc 101 when the recorder and player subsystem 10b is writing or reading data on or from the optical disc 101.

FIG. 8 is a flowchart illustrating operating processes of the recorder and player subsystems 10*a* and 10*b* of the disc recorder and player apparatus according to the second embodiment, in a case where the recorder and player subsystem 10*a* writes or reads data on or from the optical disc 101 when the recorder and player subsystem 10*b* is writing or reading data on or from the optical disc 101.

In step S51, the controller 18*a* receives a command to write or read data, from the host apparatus 5 via the host interface 19*a*.

In step S52, the controller 18*a* calculates a radial position of a target track on the optical disc 101, the data being to be written on or read from the target track.

In step S53, the controller 18*a* calculates a radial position to which the optical pickup 11*a* is to be moved.

When the optical pickup 11a should be moved, in steps S54 and S55, the controller 18a transmits a request signal to the controller 18b for moving the optical pickup 11a.

In step S56, the controller 18b determines whether or not to allow to move the optical pickup 11a, based on the current operation of the recorder and player subsystem 10b (in other words, whether data is being written or read). When the recorder and player subsystem 10b is writing or reading data, the controller 18b prohibits the recorder and player subsystem 10a from writing and reading data as well as moving the optical pickup 11a. If YES in step S56, the process proceeds to step S57. If NO in step S56, the controller 18b repeats step S56, and waits until the recorder and player subsystem 10b has completed to write or read data.

In steps S57 and S58, the controller 18b transmits a response signal to the controller 18a for moving the optical pickup 11a. By transmitting this response signal, the controller 18b notifies the controller 18a of the allowance for moving the optical pickup 11a.

Steps S59 to S62 are similar to steps S6 to S9 of FIG. 2.

As described above, when it is requested that the recorder and player subsystem 10a writes or reads data, the controller 18a moves the optical pickup 11a using the traverse motor 12a only in the case where the recorder and player subsystem 10b is not writing or reading data. When it is requested that the recorder and player subsystem 10b writes or reads data and the recorder and player subsystem 10a also writes or reads data, the controller 18a moves the optical pickup 11a using the traverse motor 12a, after the recorder and player subsystem 10b has completed to write or read data.

If a vibration or shock caused by the movement of the optical pickup 11a is expected to be small, or if the influence of the vibration or shock upon writing or reading of data by the other optical pickup 11b can be ignored, then the optical pickup 11a may be moved regardless of the operation of the optical pickup 11b.

Figure 9:
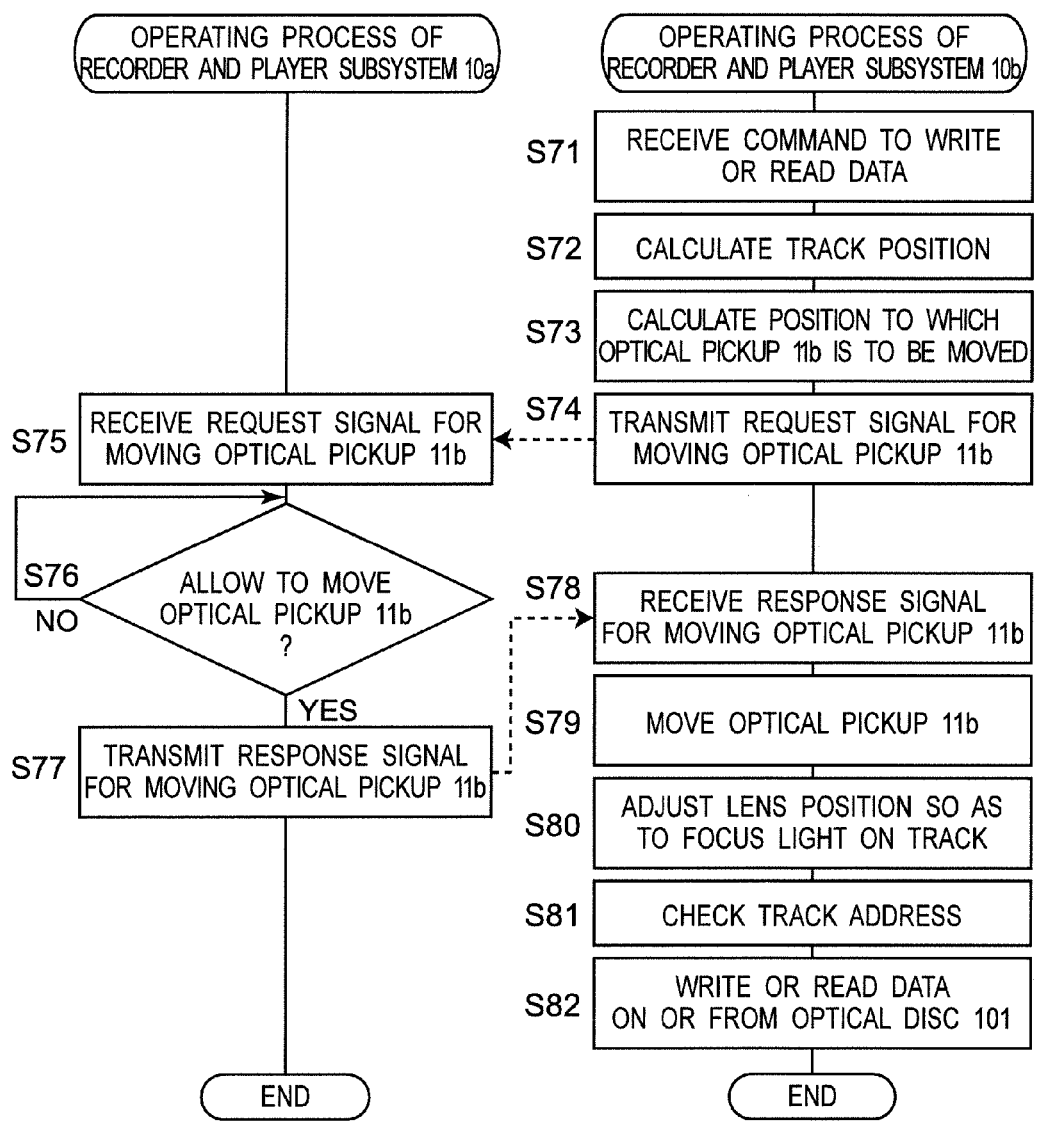
FIG. 9 is a flowchart illustrating operating processes of the recorder and player subsystems 10a and 10b of the disc recorder and player apparatus according to the second embodiment, in a case where the recorder and player subsystem 10b writes or reads data on or from the optical disc 101 when the recorder and player subsystem 10a is writing or reading data on or from the optical disc 101.

FIG. 9 is a flowchart illustrating operating processes of the recorder and player subsystems 10a and 10b of the disc recorder and player apparatus according to the second embodiment, in a case where the recorder and player subsystem 10b writes or reads data on or from the optical disc 101 when the recorder and player subsystem 10a is writing or reading data on or from the optical disc 101.

In step S71, the controller 18b receives a command to write or read data, from the host apparatus 5 via the host interface 19b.

In step S72, the controller 18b calculates a radial position of a target track on the optical disc 101, the data being to be written on or read from the target track.

In step S73, the controller 18b calculates a radial position to which the optical pickup 11b is to be moved.

In steps S74 and S75, the controller 18b transmits a request signal to the controller 18a for moving the optical pickup 11b.

In step S76, the controller 18a determines whether or not to allow to move the optical pickup 11b, based on the current operation of the recorder and player subsystem 10a (in other words, whether data is being written or read). When the recorder and player subsystem 10a is writing or reading data, the controller 18a prohibits the recorder and player subsystem 10b from writing and reading data as well as moving the optical pickup 11b. If YES in step S76, the process proceeds to step S77. If NO in step S76, the controller 18a repeats step S76, and waits until the recorder and player subsystem 10a has completed to write or read data.

In steps S77 and S78, the controller 18a transmits a response signal to the controller 18b for moving the optical pickup 11b. By transmitting this response signal, the controller 18a notifies the controller 18b of the allowance for moving the optical pickup 11b.

Steps S79 to S82 are similar to steps S30 to S33 of FIG. 4.

As described above, when it is requested that the recorder and player subsystem 10b writes or reads data, the controller 18b moves the optical pickup 11b using the traverse motor 12b only in the case where the recorder and player subsystem 10a is not writing and reading data. When it is requested that the recorder and player subsystem 10a writes or reads data and the recorder and player subsystem 10b also writes or reads data, the controller 18b moves the optical pickup 11b using the traverse motor 12b, after the recorder and player subsystem 10a has completed to write or read data.

If the vibration or shock caused by the movement of the optical pickup 11b is expected to be small, or if the influence of the vibration or shock upon writing or reading of data by the other optical pickup 11a can be ignored, then the optical pickup 11b may be moved regardless of the operation of the optical pickup 11a.

According to the processes of FIGS. 8 and 9, the disc recorder and player apparatus 1 can appropriately determine whether or not to move the optical pickups 11a and 11b, based on the operations of the recorder and player subsystems 10a and 10b. As a result, it is possible to provide the disc recorder and player apparatus less likely to impair the data writing and reading performance, and thus operable efficiently, when receiving a command to write or read data as well as move the one of the optical pickups 11a and 11b.

2-3. Advantageous Effects

As described above, according to this embodiment, when it is requested that the first recorder and player subsystem of the recorder and player subsystems 10a and 10b writes or reads data, the controller 18a or 18b moves the optical pickup of the first recorder and player subsystem using the traverse motor of the first recorder and player subsystem only in the case where the other one of the recorder and player subsystems 10a and 10b is not writing and reading data.

According to this embodiment, when it is requested that the first recorder and player subsystem of the recorder and player subsystems 10a and 10b writes or reads data and the second recorder and player subsystem of the recorder and player subsystems 10a and 10b also writes or reads data, the controller 18a or 18b moves the optical pickup of the second recorder and player subsystem using the traverse motor of the second recorder and player subsystem, after the first recorder and player subsystem has completed to write or read data.

Thus, it is possible to provide the disc recorder and player apparatus 1 less likely to impair the data writing and reading performance (for example, signal quality of written or read data, a data writing or reading rate), even though including the plurality of recorder and player subsystems 10a and 10b.

According to this embodiment, when moving one of the optical pickups 11a and 11b, it is checked that the other one of the optical pickups 11a and 11b is not writing or reading data. Therefore, even when the vibration or shock occurs due to the movement of the optical pickup, it is possible to reduce an adverse influence upon the data writing or reading performance of the disc recorder and player apparatus.

Third Embodiment

A third embodiment will be described below with reference to FIG. 10.

The first and second embodiments have described the examples of the disc recorder and player apparatus that includes the two recorder and player subsystems including the optical pickups opposing two sides of a double-sided disc, respectively, and can write and read data on and from both the sides of the disc. The third embodiment will describe an example of a disc recorder and player apparatus that includes a plurality of recorder and player subsystems including optical pickups opposing one recording surface of a both-sided disc or one-side disc, respectively, and can write and read data on and from the one recording surface. In the following description, the same reference signs as those of the first and second embodiments denote components similar to those of the first and second embodiments, and their detailed descriptions will be omitted.

3. Configuration

Figure 10:
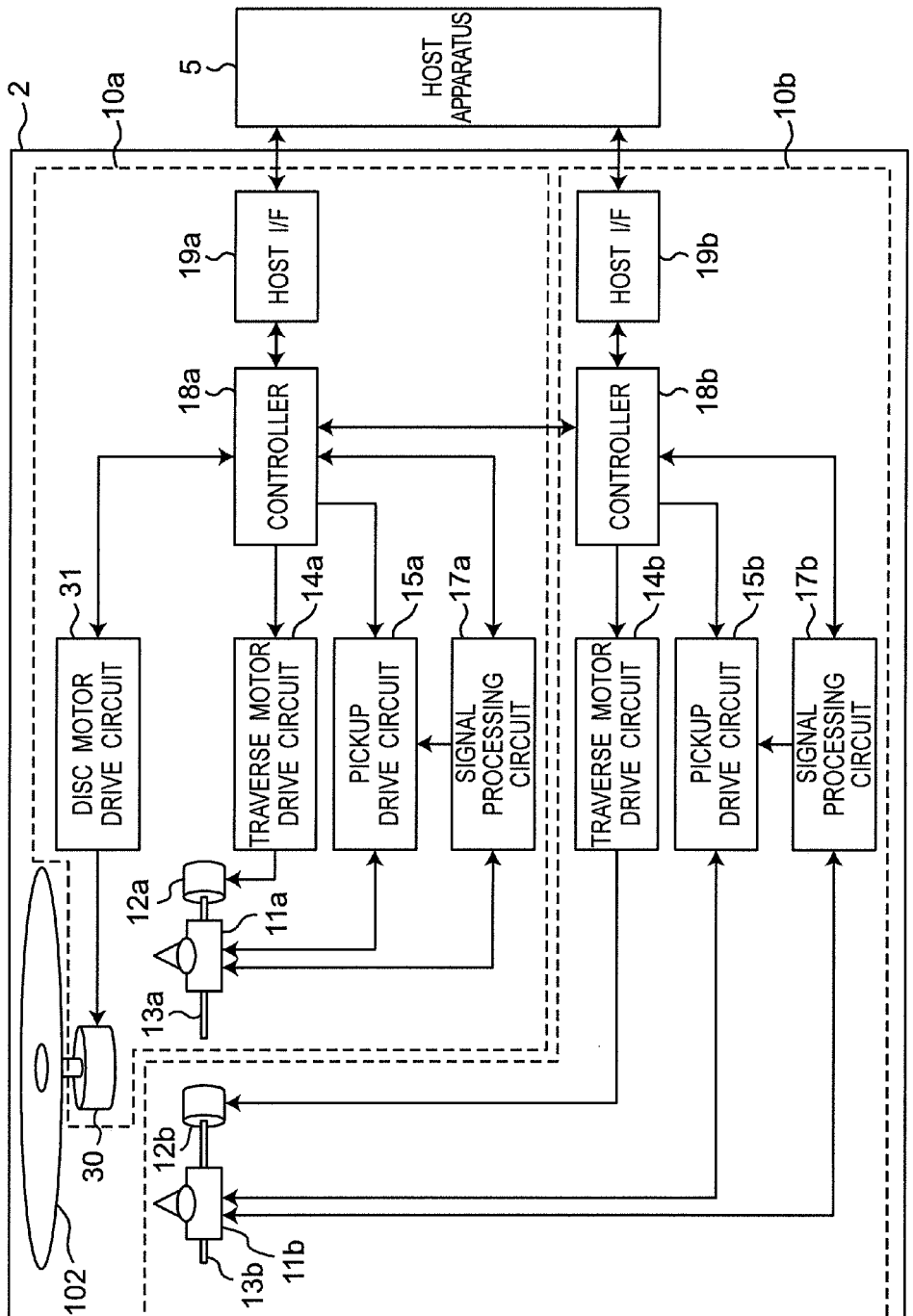
FIG. 10 is a block diagram illustrating a configuration of a disc recorder and player apparatus 2 according to a third embodiment.

FIG. 10 is a block diagram illustrating a configuration of a disc recorder and player apparatus 2 according to the third embodiment.

An optical disc 102 has a recording surface on only one side thereof. The optical disc 102 is a recording medium where data can be written on or read from this recording surface.

The disc recorder and player apparatus 2 includes recorder and player subsystems 10a and 10b. Both the recorder and player subsystems 10a and 10b are disposed below (recording surface side of) the optical disc 102. The recorder and player subsystems 10a and 10b of FIG. 10 have components similar to those of the recorder and player subsystems 10a and 10b of FIG. 1, respectively. The optical pickup 11a of the recorder and player subsystem 10a and the optical pickup 11b of the recorder and player subsystem 10b are provided on such positions that the optical pickups 11a and 11b do not interfere with each other even when moving in a radial direction of the optical disc 101 (for example, symmetrical positions about a center of the optical disc 101). In the embodiment, the disc recorder and player apparatus 2 is configured so that the recorder and player subsystems 10a and 10b can simultaneously write and simultaneously read data on and from the optical disc 102.

The disc recorder and player apparatus 2 can operate in a manner similar to that of the disc recorder and player apparatuses 1 according to the first and second embodiments, and therefore, the detailed description will be omitted.

According to the third embodiment, even when using the optical disc 102 having a recording layer on only one side of the disc, it is possible to provide the disc recorder and player apparatus 2 less likely to impair the data writing and reading performance, in a manner similar to that of the disc recorder and player apparatuses 1 according to the first and second embodiments.

Fourth Embodiment

A fourth embodiment will be described below with reference to FIGS. 11 to 13.

The first to third embodiments have described the examples of the disc recorder and player apparatuses 1 and 2 in which the recorder and player subsystems 10a and 10b include the controllers 18a and 18b, respectively, and the controllers 18a and 18b cooperate with each other to determine which of the recorder and player subsystems 10a and 10b has the control rights of the disc motor 30. The fourth embodiment will describe an example of a disc recorder and player apparatus in which one controller controls a disc motor and two recorder and player subsystems. In the following description, the same reference signs as those of the first to third embodiments denote components similar to those of the first to third embodiments, and their detailed descriptions will be omitted.

4-1. Configuration

Figure 11:
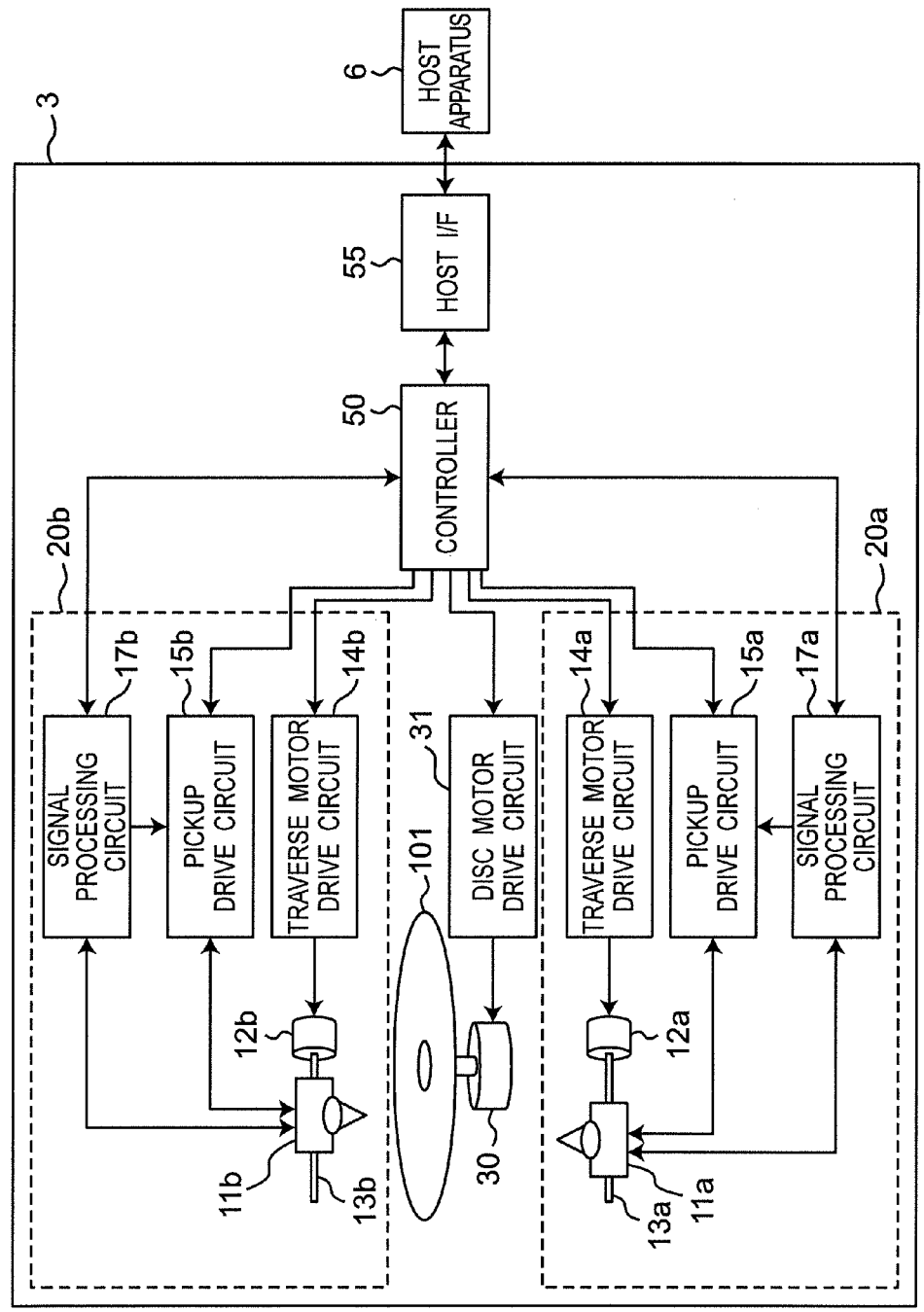
FIG. 11 is a block diagram illustrating a configuration of a disc recorder and player apparatus 3 according to a fourth embodiment.

FIG. 11 is a block diagram illustrating a configuration of a disc recorder and player apparatus 3 according to the fourth embodiment. In the embodiment, the disc recorder and player apparatus 3 is configured to be capable of writing and reading data on and from both sides of an optical disc 101.

The disc recorder and player apparatus 3 includes a disc motor 30, a disc motor drive circuit 31, a recorder and player subsystem 20a, a recorder and player subsystem 20b, a controller 50, and a host interface 55.

The recorder and player subsystem 20a includes an optical pickup 11a, a traverse motor 12a, a lead screw 13a, a traverse motor drive circuit 14a, a pickup drive circuit 15a, and a signal processing circuit 17a. These components of the recorder and player subsystem 20a are configured in a manner similar to that of the corresponding components of the recorder and player subsystem 10a of FIG. 1.

The recorder and player subsystem 20b includes an optical pickup 11b, a traverse motor 12b, a lead screw 13b, a traverse motor drive circuit 14b, a pickup drive circuit 15b, and a signal processing circuit 17b. These components of the recorder and player subsystem 20b are configured in a manner similar to that of the corresponding components of the recorder and player subsystem 10b of FIG. 1.

The controller 50 controls the respective components of the disc recorder and player apparatus 3. The controller 50 controls the components of the disc recorder and player apparatus 3 according to a write command, a read command, and the like from a host apparatus 6, and controls writing and reading of data on and from the side A and the side B of the optical disc 101.

4-2. Operation

An operation of the disc recorder and player apparatus 3 with an aforementioned configuration will be described below.

Figure 12:
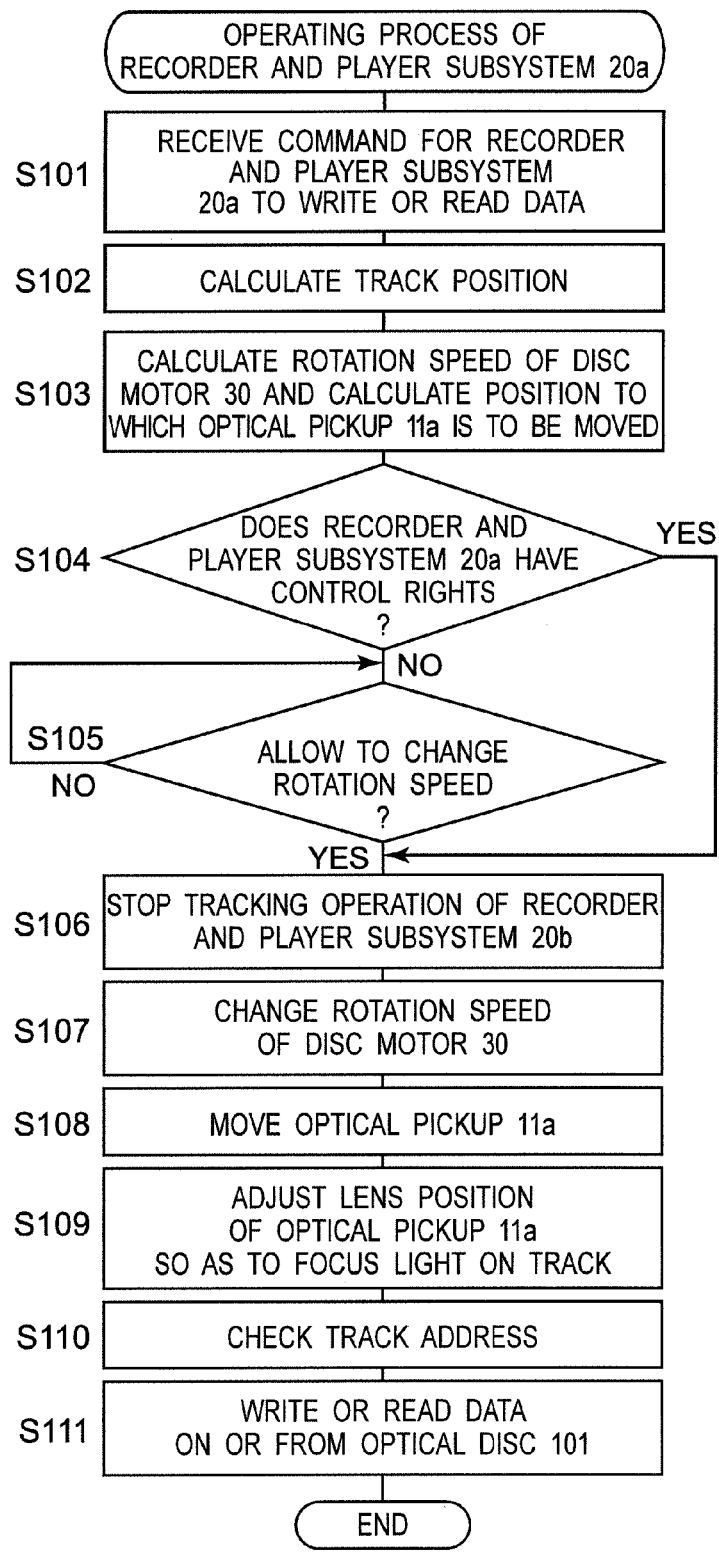
FIG. 12 is a flowchart illustrating an operating process in a case where a recorder and player subsystem 20a of FIG. 11 writes or reads data on or from an optical disc 101.

FIG. 12 is a flowchart illustrating an operating process in a case where the recorder and player subsystem 20a of FIG. 11 writes or reads data on and from the optical disc 101.

In step S101, the controller 50 receives a command for the recorder and player subsystem 20a to write or read data, from the host apparatus 6 via the host interface 55.

In step S102, the controller 50 calculates a radial position of a target track on the optical disc 101, the data being to be written on or read from the target track.

In step S103, the controller 50 calculates a rotational speed of the disc motor 30, and calculates a radial position to which the optical pickup 11a is to be moved.

In step S104, the controller 50 determines whether or not the recorder and player subsystem 20a has control rights. If YES in step S104, the process proceeds to step S106. If NO in step S104, the process proceeds to step S105.

In step S105, the controller 50 determines whether or not to allow to change the rotational speed of the disc motor 30 (in other words, whether or not to allow to transfer the control rights), based on current operations of the recorder and player subsystems 20a and 20b. If YES in step S105, the process proceeds to step S106. If NO in step S105, the controller 50 repeats step S105.

In step S106, the controller 50 stops the tracking control of the recorder and player subsystem 20b.

In step S107, the controller 50 controls the disc motor drive circuit 31 to change the rotational speed of the disc motor 30.

In step S108, the controller 50 controls the traverse motor drive circuit 14a to drive the traverse motor 12a, and thus, move the optical pickup 11a to the radial position of the target track.

In step S109, the controller 50 controls the pickup drive circuit 15a to adjust a position of a lens of the optical pickup 11a so as to focus light onto a target recording layer and the target track.

In step S110, the signal processing circuit 17a extracts an address from a signal obtained from reflected light of the optical disc 101, and the controller 50 checks that the extracted address is identical to the address of the target track.

In step S111, the controller 50 controls the pickup drive circuit 15a and the signal processing circuit 17a to write or read data on or from the optical disc 101.

According to FIG. 12, the one controller 50 can execute the process similar to the process of FIG. 3 executed by the two controllers 18a and 18b.

Figure 13:
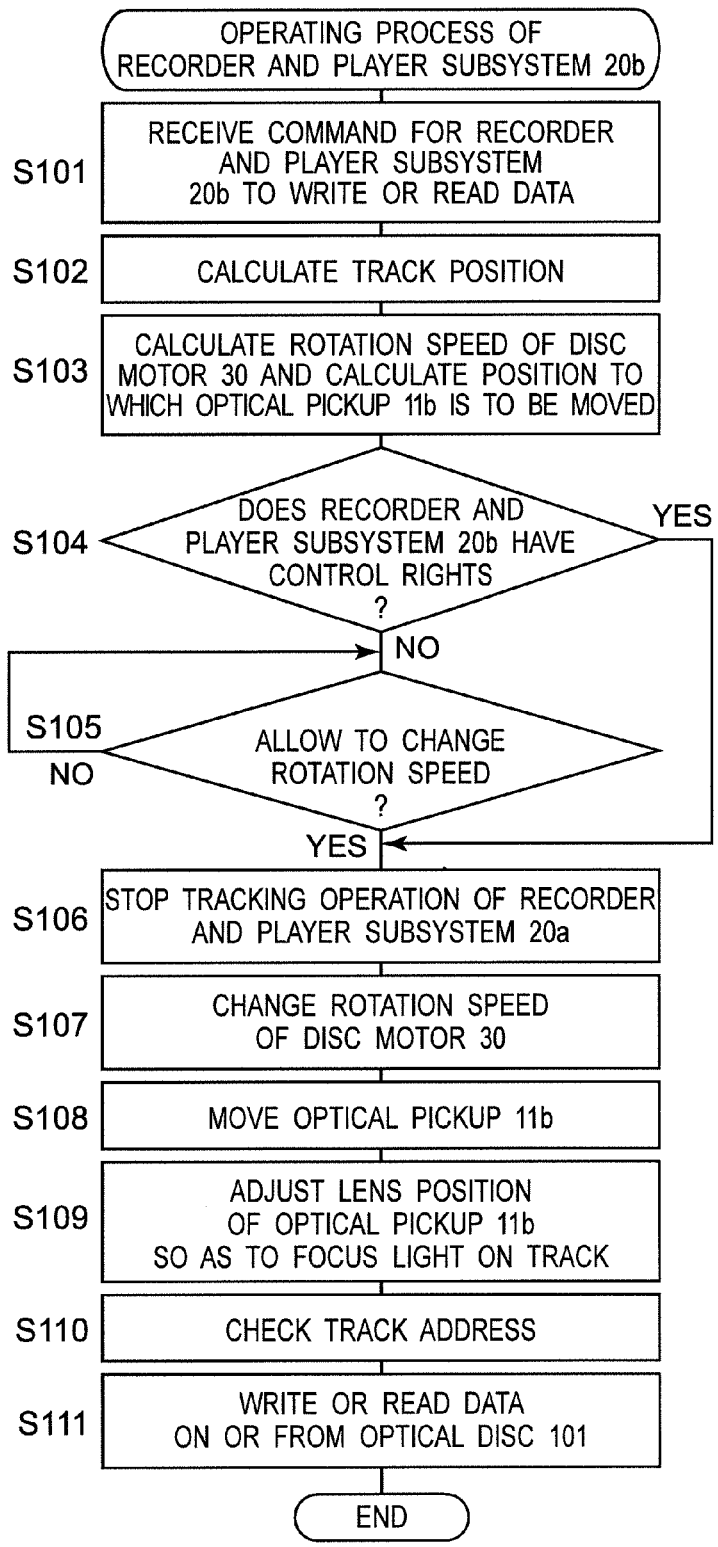
FIG. 13 is a flowchart illustrating an operating process in a case where a recorder and player subsystem 20b of FIG. 11 writes or reads data on or from the optical disc 101.

FIG. 13 is a flowchart illustrating an operating process in a case where the recorder and player subsystem 20b of FIG. 11 writes or reads data on or from the optical disc 101.

In step S121, the controller 50 receives a command for the recorder and player subsystem 20b to write or read data, from the host apparatus 6 via the host interface 55.

In step S122, the controller 50 calculates a radial position of a target track on the optical disc 101, the data being to be written on or read from the target track.

In step S123, the controller 50 calculates a rotational speed of the disc motor 30, and calculates a radial position to which the optical pickup 11b is to be moved.

In step S124, the controller 50 determines whether or not the recorder and player subsystem 20b has control rights. If YES in step S124, the process proceeds to step S126. If NO in step S124, the process proceeds to step S125.

In step S125, the controller 50 determines whether or not to allow to change the rotational speed of the disc motor 30 (in other words, whether or not to allow to transfer the control rights), based on current operations of the recorder and player subsystems 20a and 20b. If YES in step S125, the process proceeds to step S126. If NO in step S125, the controller 50 repeats step S125.

In step S126, the controller 50 stops the tracking control of the recorder and player subsystem 20a.

In step S127, the controller 50 controls the disc motor drive circuit 31 to change the rotational speed of the disc motor 30.

In step S128, the controller 50 controls the traverse motor drive circuit 14b to drive the traverse motor 12b, and thus, move the optical pickup 11b to the radial position of the target track.

In step S129, the controller 50 controls the pickup drive circuit 15b to adjust a position of a lens of the optical pickup 11b so as to focus light onto a target recording layer and the target track.

In step S130, the signal processing circuit 17b extracts an address from a signal obtained from reflected light of the optical disc 101, and the controller 50 checks that the extracted address is identical to the address of the target track.

In step S131, the controller 50 controls the pickup drive circuit 15b and the signal processing circuit 17b to write or read data on or from the optical disc 101.

According to FIG. 13, the one controller 50 can execute the process similar to the process of FIG. 5 executed by the two controllers 18a and 18b.

4-3. Advantageous Effects

According to this embodiment, the disc recorder and player apparatus 3 includes the recorder and player subsystems 20a and 20b that write and read data on and from at least one recording surface of the optical disc 101, the disc motor 30 that rotates the optical disc 101, and the controller 50. The recorder and player subsystems 20a and 20b include the optical pickups 11a and 11b, and the traverse motors 12a and 12b, respectively. Each of the optical pickups 11a and 11b write and read data on and from one recording surface of the optical disc 101. The traverse motors 12a and 12b move the optical pickups 11a and 11b in the radial direction of the optical disc 101, respectively. When one of the recorder and player subsystems 20a and 20b writes or reads data on or from a first track of the plurality of tracks on the optical disc 101, the controller 50 prohibits the other one of the recorder and player subsystems 20a and 20b from writing and reading data on and from the second track of the plurality of tracks on the optical disc 101 as well as moving the optical pickup to the second track, the second track being at a position different from the position of the first track, and the second track being to be accessed at a rotational speed different from the rotational speed for the first track.

According to this embodiment, the controller 50 allocates control rights for controlling the rotational speed of the disc motor 30, to one of the recorder and player subsystems 20a and 20b. The controller 50 operates the disc motor 30 at a rotational speed for a track on or from which the recorder and player subsystem having the control rights write or read data.

Thus, it is possible to provide the disc recorder and player apparatus 3 less likely to impair the data writing and reading performance, even though including the plurality of recorder and player subsystems 20a and 20b.

Fifth Embodiment

A fifth embodiment will be described below with reference to FIG. 14 and FIG. 15.

5-1. Configuration

A disc recorder and player apparatus according to the fifth embodiment is configured in a manner similar to that of the disc recorder and player apparatus 3 of FIG. 11.

5-2. Operation

This embodiment provides the disc recorder and player apparatus less likely to impair the data writing and reading performance, and thus operable efficiently, when receiving a command to write or read data as well as move one of the optical pickups 11a and 11b, in a manner similar to that of the second embodiment.

Figure 14:
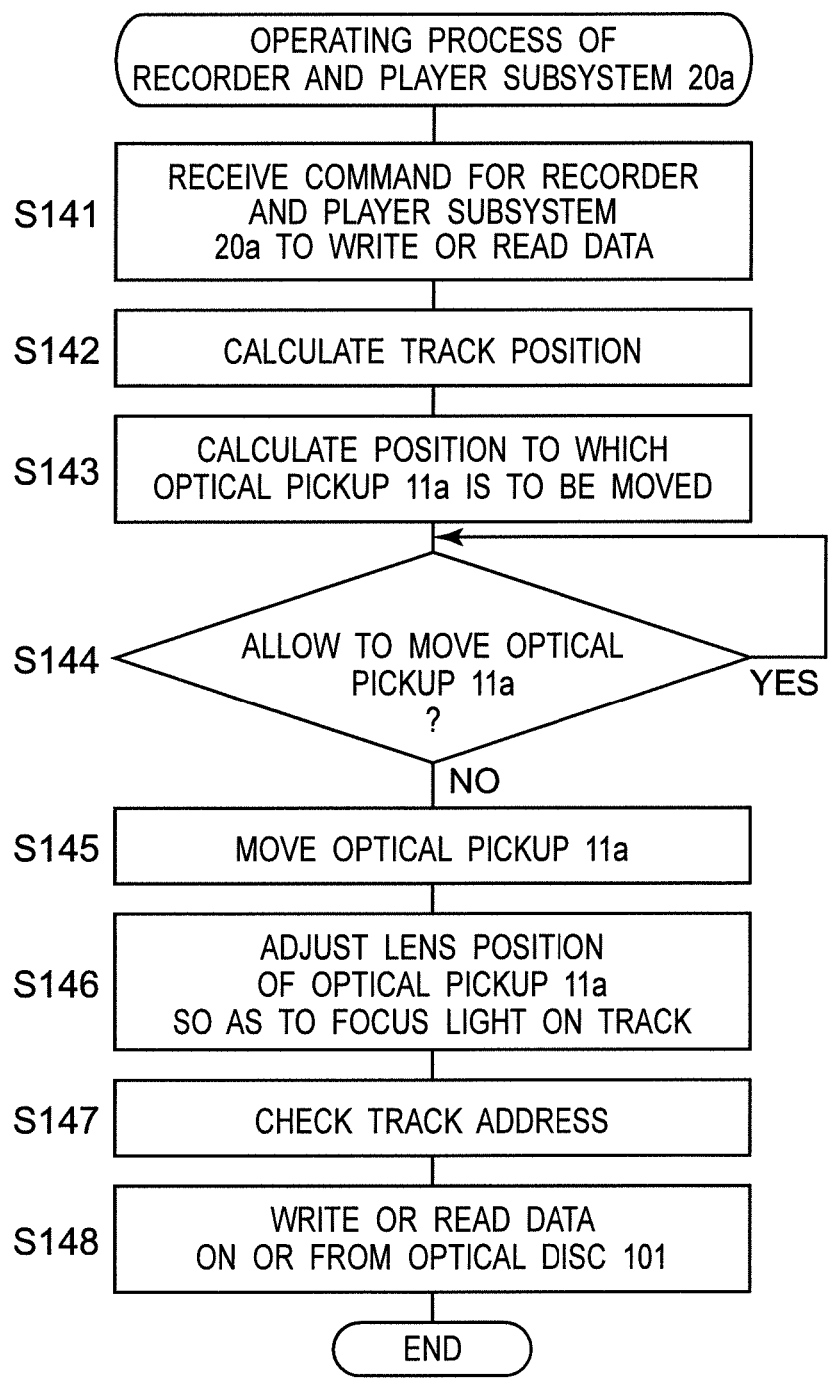
FIG. 14 is a flowchart illustrating an operating process in a case where a recorder and player subsystem 20a of a disc recorder and player apparatus 3 according to a fifth embodiment writes or reads data on or from an optical disc 101.

FIG. 14 is a flowchart illustrating an operating process in a case where the recorder and player subsystem 20a of the disc recorder and player apparatus 3 according to the fifth embodiment writes or reads data on or from the optical disc 101.

In step S141, the controller 50 receives a command for the recorder and player subsystem 20a to write or read data, from the host apparatus 6 via the host interface 55.

In step S142, the controller 50 calculates a radial position of a target track on the optical disc 101, the data being to be written on or read from the target track.

In step S143, the controller 50 calculates a radial position to which the optical pickup 11a is to be moved.

In step S144, the controller 50 determines whether or not to allow to move the optical pickup 11a, based on the current operation of the recorder and player subsystem 20b. If YES in step S144, the process proceeds to step S145. If NO in step S144, the controller 50 repeats step S144.

In step S145, the controller 50 controls the traverse motor drive circuit 14a to drive the traverse motor 12a, and thus, move the optical pickup 11a to the radial position of the target track.

In step S146, the controller 50 controls the pickup drive circuit 15a to adjust a position of a lens of the optical pickup 11a so as to focus light onto a target recording layer and the target track.

In step S147, the signal processing circuit 17a extracts an address from a signal obtained from reflected light of the optical disc 101, and the controller 50 checks that the extracted address is identical to the address of the target track.

In step S148, the controller 50 controls the pickup drive circuit 15a and the signal processing circuit 17a to write or read data on or from the optical disc 101.

According to FIG. 14, the one controller 50 can execute the process similar to the process of FIG. 8 executed by the two controllers 18a and 18b.

Figure 15:
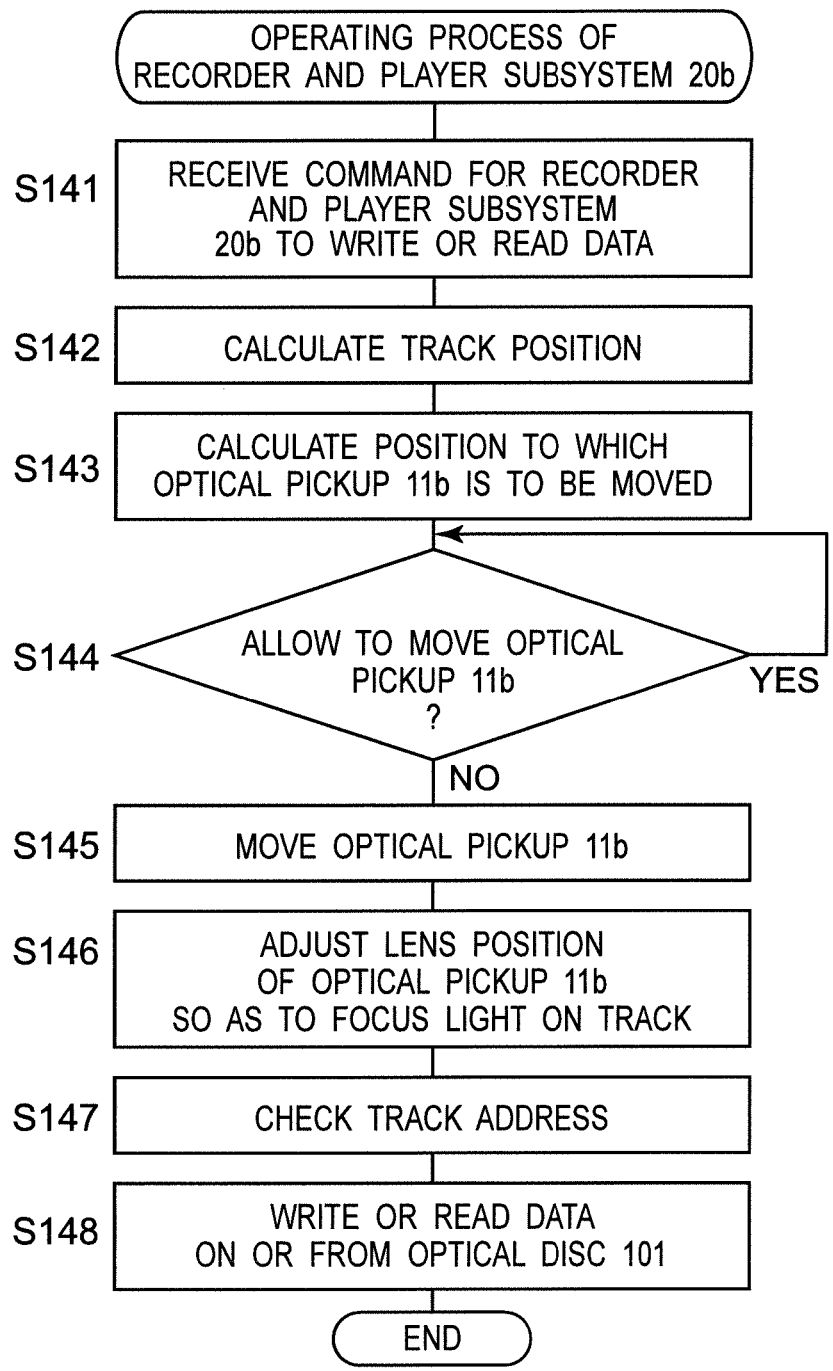
FIG. 15 is a flowchart illustrating an operating process in a case where a recorder and player subsystem 20b of the disc recorder and player apparatus 3 according to the fifth embodiment writes or reads data on or from the optical disc 101.

FIG. 15 is a flowchart illustrating an operating process in a case where the recorder and player subsystem 20b of the disc recorder and player apparatus 3 according to the fifth embodiment writes or reads data on or from the optical disc 101.

In step S151, the controller 50 receives a command for the recorder and player subsystem 20b to write or read data, from the host apparatus 6 via the host interface 55.

In step S152, the controller 50 calculates a radial position of a target track on the optical disc 101, the data being to be written on or read from the target track.

In step S153, the controller 50 calculates a radial position to which the optical pickup 11b is to be moved.

In step S154, the controller 50 determines whether or not to allow to move the optical pickup 11b, based on the current operation of the recorder and player subsystem 20a. If YES in step S154, the process proceeds to step S155. If NO in step S154, the controller 50 repeats step S154.

In step S155, the controller 50 controls the traverse motor drive circuit 14b to drive the traverse motor 12b, and thus, move the optical pickup 11b to the radial position of the target track.

In step S156, the controller 50 controls the pickup drive circuit 15b to adjust a position of a lens of the optical pickup 11b so as to focus light onto a target recording layer and the target track.

In step S157, the signal processing circuit 17b extracts an address from a signal obtained from reflected light of the optical disc 101, and the controller 50 checks that the extracted address is identical to the address of the target track.

In step S158, the controller 50 controls the pickup drive circuit 15b and the signal processing circuit 17b to write or read data on or from the optical disc 101.

According to FIG. 15, the one controller 50 can execute the process similar to the process of FIG. 9 executed by the two controllers 18a and 18b.

5-3. Advantageous Effects

As described above, according to this embodiment, when it is requested that the first recorder and player subsystem of the recorder and player subsystems 20a and 20b writes or reads data, the controller 50 moves the optical pickup of the first recorder and player subsystem using the traverse motor of the first recorder and player subsystem only in the case where the other one of the recorder and player subsystems 20a and 20b is not writing or reading data.

According to this embodiment, when it is requested that the first recorder and player subsystem of the recorder and player subsystems 20a and 20b writes or reads data and the second recorder and player subsystem of the recorder and player subsystems 20a and 20b also writes or reads data, the controller 50 moves the optical pickup of the second recorder and player subsystem using the traverse motor of the second recorder and player subsystem, after the first recorder and player subsystem has completed to write or read data.

Thus, it is possible to provide the disc recorder and player apparatus 3 less likely to impair the data writing and reading performance, even though including the plurality of recorder and player subsystems 20a and 20b.

Sixth Embodiment

A sixth embodiment will be described below with reference to FIG. 16.

The fourth and fifth embodiments have described the example of the disc recorder and player apparatus that includes the two recorder and player subsystems including the optical pickups opposing two sides of a double-sided disc, respectively, and can write and read data on and from both the sides of the disc. The sixth embodiment will describe an example of a disc recorder and player apparatus that includes a plurality of recorder and player subsystems including optical pickups opposing one recording surface of a both-sided disc or one-side disc, respectively, and can write and read data on and from the one recording surface. In the following description, the same reference signs as those of the fourth and fifth embodiments denote components similar to those of the fourth and fifth embodiments, and their detailed descriptions will be omitted.

6. Configuration

Figure 16:
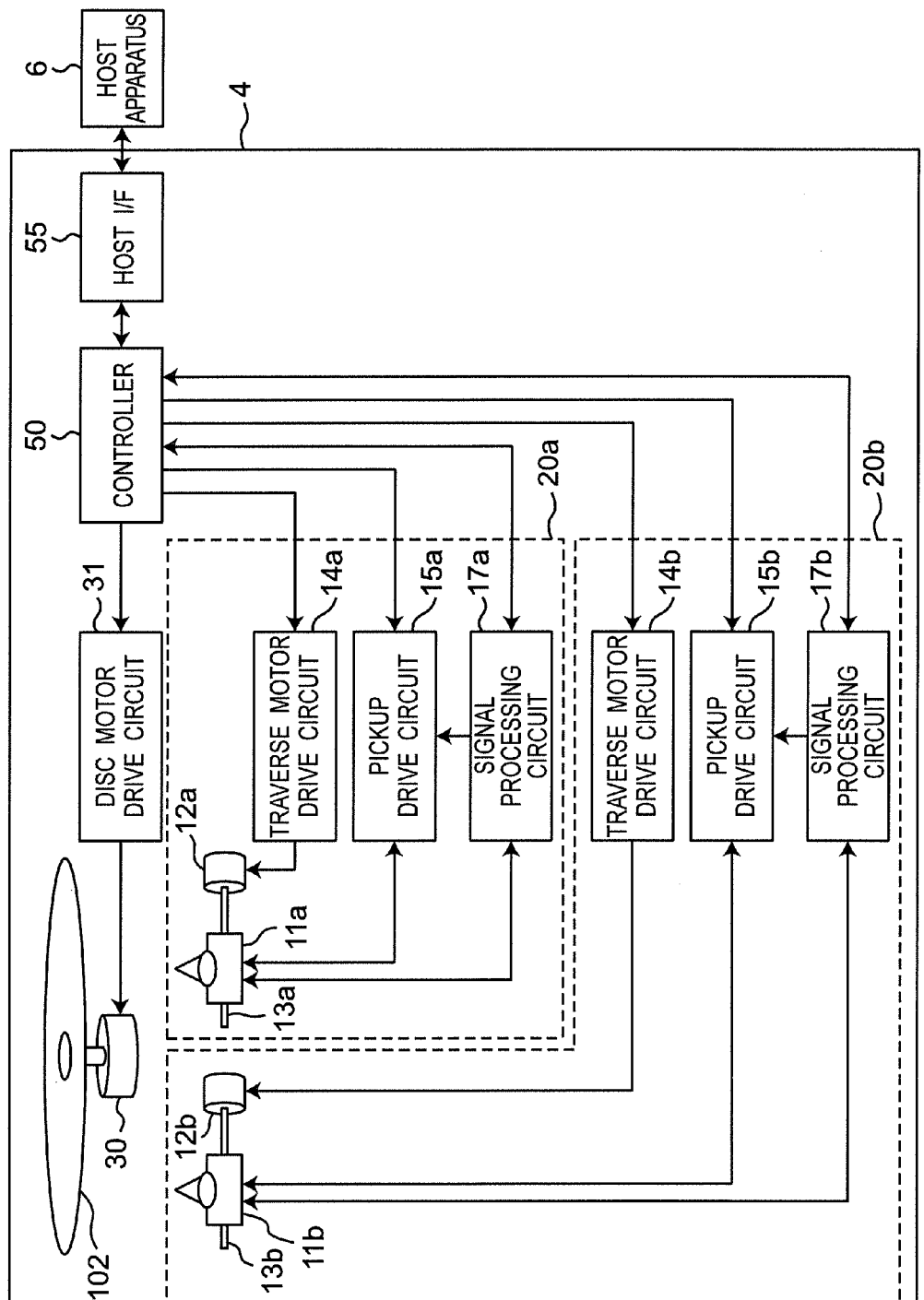
FIG. 16 is a block diagram illustrating a configuration of a disc recorder and player apparatus 4 according to a sixth embodiment.

FIG. 16 is a block diagram illustrating a configuration of a disc recorder and player apparatus 4 according to the sixth embodiment.

The disc recorder and player apparatus 4 includes recorder and player subsystems 20a and 20b, a disc motor 30, a disc motor drive circuit 31, a controller 50, and a host interfaces 55. The recorder and player subsystems 20a and 20b of FIG. 16 include components similar to the components of the recorder and player subsystems 20a and 20b of FIG. 11, respectively.

The disc recorder and player apparatus 4 can operate in a manner similar to that of the disc recorder and player apparatuses 3 according to the fourth and fifth embodiments, and therefore, the detailed description will be omitted.

According to the sixth embodiment, even when using the optical disc 102 having a recording layer on only one side of the disc, it is possible to provide the disc recorder and player apparatus 3 less likely to impair the data writing and reading performance, in a manner similar to that of the disc recorder and player apparatuses 3 according to the fourth and fifth embodiments.

Other Embodiments

The first to sixth embodiments have been described above as examples of the techniques disclosed by this application. However, the techniques of this disclosure are not limited thereto, and are applicable to embodiments with appropriate modification, replacement, addition, omission, and so on.

The elements described in the first to sixth embodiments can be combined to form a new embodiment.

Therefore, the other embodiments will be described below.

According to the first, second, fourth, and fifth embodiments, the recorder and player subsystem 10a, including the disc motor 30 and the disc motor drive circuit 31, is disposed below the optical disc 101. Alternatively, the recorder and player subsystem 10a may be disposed above the optical disc 101, and the recorder and player subsystem 10b may be disposed below the optical disc 101. In addition, the disc recorder and player apparatus 1 may hold the optical disc 101 vertically to a floor surface, and the recorder and player subsystems 10a and 10b may be disposed to write and read data on and from the respective surfaces of the optical disc 101 held in such a manner. In addition, according to the first, second, fourth, and fifth embodiments, one recorder and player subsystem is provided for each surface of the optical disc 101. Alternatively, a plurality of recorder and player subsystems may be provided for each surface of the optical disc 101.

The first to sixth embodiments have described the configuration in which the disc recorder and player apparatus includes the two optical pickups 11a and 11b, and includes the traverse motors 12a, 12b and the lead screws 13a, 13b as many as the number of optical pickups. Each of the number of optical pickups, the number of traverse motors, and the number of lead screws is not limited to two, and may be more than two. As a result, it is possible to increase an amount of data to be simultaneously written or read, thus increasing a data transfer rate.

According to the third and sixth embodiments, the two optical pickups are provided opposing the recording surface of the optical disc 102. Alternatively, more than two optical pickups may be provided.

The first to sixth embodiments have described the configuration of exemplary optical pickups, each including a set of one laser light source and one lens. Each of the optical pickups is not limited to include only one set of the laser light source and the lens, and may include more than one sets of laser light sources and lenses. In this case, the disc recorder and player apparatus includes corresponding pickup drive circuits and signal processing circuits, as many as the number of sets of laser light sources and lenses. As a result, it is possible to increase an amount of data to be simultaneously written or read, thus further increasing a data transfer rate. In addition, by using such an optical pickup, it is possible to read and check data immediately after recording of the data on an optical disc.

The first and fourth embodiments have described the case where when one of the recorder and player subsystems transfers the control rights of the disc motor 30 to the other one of the recorder and player subsystems, the recorder and player subsystem having transferred the control rights stops the tracking control on the optical disc 101. As a result, it is possible to avoid unstable servo control of the recorder and player subsystems. The configuration for avoiding the unstable servo control of the recorder and player subsystems is not limited thereto, and the focus control may be stopped instead of stopping of the tracking control. However, in general, since a time required to restart the tracking control is shorter than a time required to restart the focus control, it is more preferred to stop the tracking control.

In the first to sixth embodiments, the tracks on the respective recording layer of the optical disc may be addressed so that the optical pickups move from inner tracks to outer tracks, or alternatively, from outer tracks to inner tracks, when writing and reading data on and from the optical disc. One optical disc may have two types of recording layers addressed in opposite directions. For example, in the case where the optical disc has a plurality of laminated recording layers on one side, the plurality of laminated recording layers are addressed in alternate directions. Even when using such an optical disc, the principles as described in the first to sixth embodiments can also be applied when the plurality of recorder and player subsystems write and read data on and from recording layers addressed in the same direction.

Since the embodiments described above are intended to exemplarily describe the techniques of this disclosure, various modifications, replacements, additions, and omissions can be made within the claims and the scope equivalent thereto.

The present disclosure is applicable to a disc recorder and player apparatus that writes or reads data on or from a disc using a plurality of optical pickups. The present disclosure is particularly useful for applications requiring high capacity per volume, high data transfer rate, and the like, such as a data archive.

The invention claimed is:

1. A disc recorder and player apparatus comprising:
    a plurality of recorder and player subsystems that write and read data on and from at least one recording surface of a disc recording medium;
    a disc motor that rotates the disc recording medium; and
    at least one controller,
    wherein each of the plurality of recorder and player subsystems comprises:
    a pickup that writes and reads data on and from one recording surface of the disc recording medium, and
    a traverse motor that moves the pickup in a radial direction of the disc recording medium, and
    wherein, when one of the plurality of recorder and player subsystems writes or reads data on or from a first track of a plurality of tracks on the disc recording medium, the controller prohibits the remaining recorder and player subsystems of the plurality of recorder and player subsystems from writing and reading data on and from a second track of the plurality of tracks on the disc recording medium as well as moving the pickup to the second track, the second track being at a position different from a position of the first track, and the second track being to be accessed at a rotational speed different from a rotational speed for the first track.

2. The disc recorder and player apparatus as claimed in claim 1,
    wherein the controller allocates control rights for controlling the rotational speed of the disc motor, to one of the plurality of recorder and player subsystems, and
    wherein the controller operates the disc motor at a rotational speed for a track on or from which a recorder and player subsystem having the control rights writes or reads data.

3. The disc recorder and player apparatus as claimed in claim 2,
    wherein, when a first recorder and player subsystem of the plurality of recorder and player subsystems, the first recorder and player subsystem having the control rights, writes or reads data, and it is requested that a second recorder and player subsystem of the plurality of recorder and player subsystems, the second recorder and player subsystem not having the control rights, writes or reads data, then the controller transfers the control rights from the first recorder and player subsystem to the second recorder and player subsystem, after the first recorder and player subsystem has completed to write or read the data.

4. The disc recorder and player apparatus as claimed in claim 2,
wherein, when a first recorder and player subsystem of the plurality of recorder and player subsystems, the first recorder and player subsystem having the control rights, writes or reads data from a first track of the plurality of tracks on the disc recording medium, the first track having a first address, and it is requested that a second recorder and player subsystem of the plurality of recorder and player subsystems, the second recorder and player subsystem not having the control rights, writes or reads data on or from a second track of the plurality of tracks on the disc recording medium, the second track having a second address smaller than the first address, then the controller stops the first recorder and player subsystem from writing or reading the data, and transfers the control rights from the first recorder and player subsystem to the second recorder and player subsystem.

5. The disc recorder and player apparatus as claimed in claim 2,
wherein, when a first recorder and player subsystem of the plurality of recorder and player subsystems, the first recorder and player subsystem having the control rights, writes or reads user data, and it is requested that a second recorder and player subsystem of the plurality of recorder and player subsystems, the second recorder and player subsystem not having the control rights, writes or reads disc management data, then the controller stops the first recorder and player subsystem from writing or reading the user data, and transfers the control rights from the first recorder and player subsystem to the second recorder and player subsystem.

6. The disc recorder and player apparatus as claimed in claim 3,
wherein, when the controller transfers the control rights from the first recorder and player subsystem to the second recorder and player subsystem, the controller stops a tracking control of the first recorder and player subsystem.

7. The disc recorder and player apparatus as claimed in claim 1,
wherein, when it is requested that a first recorder and player subsystem of the plurality of recorder and player subsystems writes or reads data, the controller moves the pickup of the first recorder and player subsystem by the traverse motor of the first recorder and player subsystem, only in a case where the remaining recorder and player subsystems of the plurality of recorder and player subsystems do not write and read data.

8. The disc recorder and player apparatus as claimed in claim 1,
wherein, when a first recorder and player subsystem of the plurality of recorder and player subsystems writes or reads data, and it is requested that a second recorder and player subsystem of the plurality of recorder and player subsystems writes or reads data, the controller moves the pickup of the second recorder and player subsystem by the traverse motor of the second recorder and player subsystem, after the first recorder and player subsystem has completed to write or read the data.

9. The disc recorder and player apparatus as claimed in claim 1, comprising a plurality of controllers that control the plurality of recorder and player subsystems, respectively,
wherein the disc motor is a part of one of the plurality of recorder and player subsystems, and
wherein the plurality of controllers cooperate with one another.

10. The disc recorder and player apparatus as claimed in claim 1,
wherein the disc recording medium has a first recording surface and a second recording surface, and
wherein the plurality of recorder and player subsystems comprise at least one recorder and player subsystem that writes and reads data on and from the first recording surface, and at least one recorder and player subsystem that writes and reads data on and from the second recording surface.

11. The disc recorder and player apparatus as claimed in claim 1,
wherein the disc recording medium has one recording surface.

12. The disc recorder and player apparatus as claimed in claim 1,
wherein the disc recording medium is a constant linear velocity (CLV) recording medium.

13. The disc recorder and player apparatus as claimed in claim 1,
wherein the disc recording medium is a zone constant angular velocity (ZCAV) recording medium.

14. The disc recorder and player apparatus as claimed in claim 1,
wherein the disc recording medium is a recording medium formed in a combination of a constant linear velocity (CLV) and a zone constant angular velocity (ZCAV).

* * * * *